US012749767B2

(12) United States Patent
Yamashita et al.

(10) Patent No.: US 12,749,767 B2
(45) Date of Patent: Sep. 29, 2026

(54) NONAQUEOUS ELECTROLYTE BATTERY, BATTERY PACK, AND VEHICLE

(71) Applicant: KABUSHIKI KAISHA TOSHIBA, Tokyo (JP)

(72) Inventors: Yasunobu Yamashita, Tokyo (JP); Kakuya Ueda, Kawasaki Kanagawa (JP); Mitsuhiro Oki, Kawasaki Kanagawa (JP); Yasuhiro Harada, Isehara Kanagawa (JP); Norio Takami, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 702 days.

(21) Appl. No.: 18/176,224

(22) Filed: Feb. 28, 2023

(65) Prior Publication Data

US 2024/0097274 A1 Mar. 21, 2024

(30) Foreign Application Priority Data

Sep. 16, 2022 (JP) ................................ 2022-148490
Feb. 9, 2023 (JP) ................................ 2023-018692

(51) Int. Cl.
*H01M 50/431* (2021.01)
*H01M 4/02* (2006.01)
(Continued)

(52) U.S. Cl.
CPC ......... *H01M 50/431* (2021.01); *H01M 4/483* (2013.01); *H01M 10/425* (2013.01); *H01M 2004/027* (2013.01); *H01M 2220/20* (2013.01)

(58) Field of Classification Search
CPC .. H01M 50/431; H01M 4/483; H01M 10/425; H01M 2004/027; H01M 2220/20
See application file for complete search history.

(56) References Cited

U.S. PATENT DOCUMENTS 6,593,031 B1 * 7/2003 Onishi ................ H01M 10/345 429/218.2
2008/0145756 A1 * 6/2008 Taniguichi ............ H01M 10/24 429/206
(Continued)

FOREIGN PATENT DOCUMENTS

CN 102142578 A 8/2011
CN 105720307 A 6/2016
(Continued)

OTHER PUBLICATIONS

SIPO, First Office Action in CN App. No. 202310167826.6 (May 20, 2026).
(Continued)

*Primary Examiner* — Nicholas A Smith
*Assistant Examiner* — Benjamin Eli Kass-Mullet
(74) *Attorney, Agent, or Firm* — Finnegan, Henderson, Farabow, Garrett & Dunner, LLP

(57) ABSTRACT

In general, according to one embodiment, a nonaqueous electrolyte battery is provided. The nonaqueous electrolyte battery includes an electrode group, including a positive electrode, a negative electrode, and a separator. The separator includes at least one metal-element containing portion containing a metal element. The at least one metal-element containing portion is provided on a surface of the separator in contact with the negative electrode. The at least one metal-element containing portion contains at least one selected from a group consisting of a metal, a metallic oxide, and a metallic fluoride. An area of the at least one metal-element containing portion is in a range of 0.3 $mm^2$ to 3.2 $mm^2$.

9 Claims, 9 Drawing Sheets

(51) Int. Cl.
*H01M 4/48* (2010.01)
*H01M 10/42* (2006.01)

(56) References Cited

U.S. PATENT DOCUMENTS

| | | | | |
|---|---|---|---|---|
| 2011/0189530 | A1* | 8/2011 | Torata | H01M 50/409 429/144 |
| 2016/0233542 | A1* | 8/2016 | Jongerden | H01M 10/0562 |
| 2018/0277882 | A1* | 9/2018 | Sugizaki | H01M 4/139 |

FOREIGN PATENT DOCUMENTS

| | | | | |
|---|---|---|---|---|
| CN | 111781510 | A | | 10/2020 |
| CN | 112928321 | A | | 6/2021 |
| CN | 113097648 | A | | 7/2021 |
| JP | 2002-75460 | A | | 3/2002 |
| JP | 2013-127857 | A | | 6/2013 |
| JP | 2016-24957 | A | | 2/2016 |
| JP | 2019-21510 | A | | 2/2019 |
| JP | 2019021510 | A | * | 2/2019 |

OTHER PUBLICATIONS

JPO, Decision to Grant a Patent in JP App. No. 2023-018692 (Apr. 28, 2026).

* cited by examiner

NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2022-148490, filed Sep. 16, 2022; and No. 2023-018692, filed Feb. 9, 2023, the entire contents of which are incorporated herein by reference.

FIELD

Embodiments described herein relate generally to a nonaqueous electrolyte battery, a battery pack, and a vehicle.

BACKGROUND

For nonaqueous electrolyte batteries such as lithium-ion secondary batteries, there has been a problem that self-discharge tends to increase in accordance with a lapse of time.

DETAILED DESCRIPTION

Figure 1:
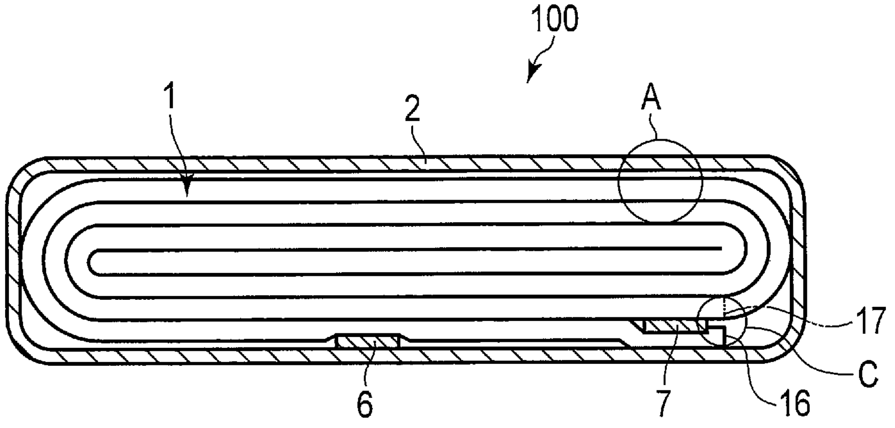
FIG. 1 is a sectional view schematically showing an exemplary nonaqueous electrolyte battery according to an embodiment.

In general, according to one embodiment, a nonaqueous electrolyte battery is provided. The nonaqueous electrolyte battery includes an electrode group, including a positive electrode, a negative electrode, and a separator. The separator includes at least one metal-element containing portion containing a metal element. The at least one metal-element containing portion is provided on a surface of the separator in contact with the negative electrode. The at least one metal-element containing portion contains at least one selected from a group consisting of a metal, a metallic oxide, and a metallic fluoride. An area of the at least one metal-element containing portion is in a range of 0.3 $mm^2$ to 3.2 $mm^2$.

According to another embodiment, a battery pack including the nonaqueous electrolyte battery of the above embodiment is offered.

According to another embodiment, a vehicle including the battery pack of the above embodiment is offered.

First Embodiment

The present inventors thoroughly analyzed the self-discharge of nonaqueous electrolyte batteries to find that one of the factors that contribute to an increase in self-discharge is admixture of metal-element containing impurities in the process of manufacturing the nonaqueous electrolyte batteries. The metallic components contained in the impurities become oxidized and dissolved in the nonaqueous electrolyte battery, thereby releasing metal ions. If the potential of the negative electrode decreases during charging, these metal ions may be precipitated on the negative electrode to deposit crystal nuclei. Metallic components may be further precipitated upon the crystal nuclei, forming unwanted large metallic crystals on the negative electrode. If a metallic crystal further grows out of the separator to come into electrical contact with the positive electrode, an internal short circuit is created, which elevates self-discharge.

Based on the above results, the present inventors have realized, through ardent investigation, a nonaqueous electrolyte battery according to the first embodiment.

According to the first embodiment, a nonaqueous electrolyte battery is offered. The nonaqueous electrolyte battery according to the first embodiment includes an electrode group, which includes a positive electrode, a negative electrode, and a separator. The separator includes at least one metal-element containing portion containing a metal element. The at least one metal-element containing portion is provided on the surface of the separator in contact with the negative electrode, where the at least one metal-element containing portion contains at least one selected from a group consisting of a metal, a metallic oxide, and a metallic fluoride. The area of the at least one metal-element containing portion is in the range of 0.3 $mm^2$ or larger and 3.2 $mm^2$ or smaller.

In the manufacturing process of nonaqueous electrolyte batteries, metallic-element containing impurities may be mixed in. In the nonaqueous electrolyte battery according to the present embodiment, even under the circumstance of a drop of the potential of the negative electrode during charge, metallic precipitation can be suppressed on the surface of the separator in contact with the negative electrode. This nonaqueous electrolyte battery, which has a metal-element containing portion as small as 0.3 $mm^2$ or larger and 3.2 $mm^2$ or smaller in area, realizes the suppression of internal shorting, and thereby suppresses self-discharge. The method for measuring the area of a metal-element containing portion in a separator will be described later.

The nonaqueous electrolyte battery according to the present embodiment will be discussed in detail with reference to the drawings.

This nonaqueous electrolyte battery may contain alkali metal ions as carrier ions, and may be a lithium battery (lithium ion battery). The nonaqueous electrolyte battery may be a secondary battery.

The nonaqueous electrolyte battery may further include a container member that accommodates the electrode group and an electrolyte.

The nonaqueous electrolyte battery may further include a negative electrode terminal electrically connected to the negative electrode and a positive electrode terminal electrically connected to the positive electrode.

Figure 2:
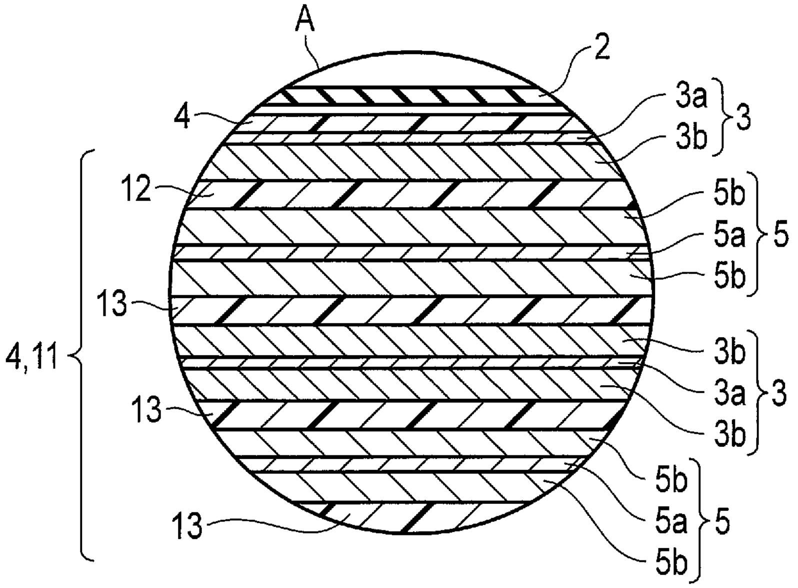
FIG. 2 is an enlarged sectional view of area A of the nonaqueous electrolyte battery shown in FIG. 1.

FIG. 1 is a sectional view schematically showing an exemplary nonaqueous electrolyte battery. FIG. 2 is an enlarged sectional view of area A of the nonaqueous electrolyte battery illustrated in FIG. 1.

The nonaqueous electrolyte battery 100 in FIGS. 1 and 2 includes a bag-type container member 2 as shown in FIG. 1, an electrode group 1 as shown in FIGS. 1 and 2, and an electrolyte that is not shown. The electrode group 1 and the electrolyte are contained in the bag-type container member 2. The electrolyte (not shown) is retained in the electrode group 1.

The bag-type container member 2 is formed of a laminate film of two resin layers and a metal layer interposed between the resin layers.

As shown in FIG. 1, the electrode group 1 is a flat, wound electrode group. This flat, wound electrode group 1 includes a negative electrode 3, a separator 4, and a positive electrode 5, as shown in FIG. 2. The separator 4 is interposed between the negative electrode 3 and positive electrode 5.

The negative electrode 3 includes a negative electrode current collector 3*a* and negative electrode active material containing layers 3*b*. The portion of the negative electrode 3 arranged at an outermost position of the wound electrode group 1 has a negative electrode active material containing layer 3*b* only on the inner surface of the negative electrode current collector 3*a*, as shown in FIG. 2. Other than this portion, the negative electrode 3 has negative electrode active material containing layers 3*b* formed on both of the reverse surfaces of the negative electrode current collector 3*a*.

The positive electrode 5 includes a positive electrode current collector 5*a* and positive electrode active material containing layers 5*b* famed on both of the reverse surfaces of the positive electrode current collector 5*a*.

As illustrated in FIG. 1, the negative electrode terminal 6 and the positive electrode terminal 7 are positioned in the vicinity of the outer peripheral edge of the wound electrode group 1. The negative electrode terminal 6 is connected to a portion of the negative electrode current collector 3*a* that is positioned outermost. The positive electrode terminal 7 is connected to a portion of the positive electrode current collector 5*a* that is positioned outermost. The negative electrode terminal 6 and positive electrode terminal 7 externally extend through the opening of the bag-type container member 2. A thermoplastic resin layer is provided on the inner surface of the bag-type container member 2 so that the opening can be closed through thermal bonding.

Figure 3:
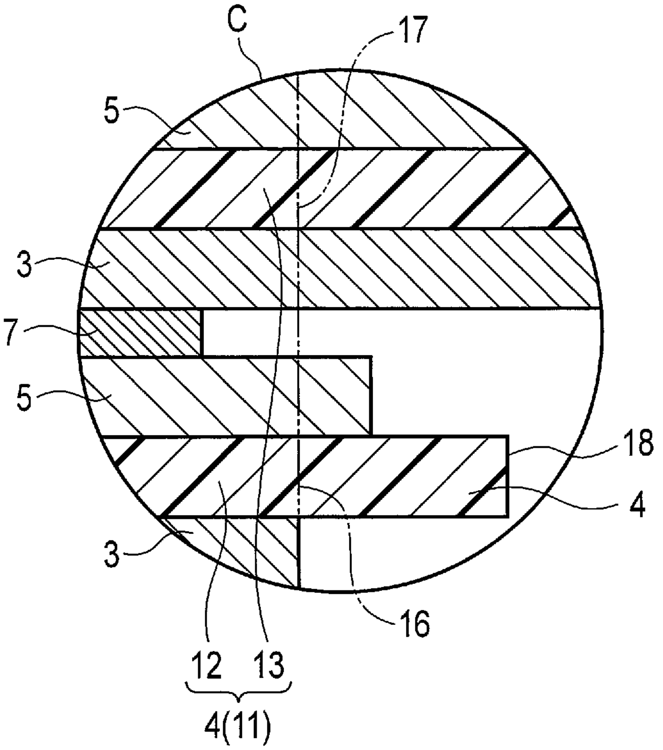
FIG. 3 is an enlarged sectional view of area C of the nonaqueous electrolyte battery shown in FIG. 1.

The electrode group of FIG. 1 has a structure in which the positive electrode, a separator, the negative electrode, and another separator (not shown) are stacked in this order and are wound in such a manner that the negative electrode will be positioned outside with respect to the positive electrode. FIG. 3 is an enlarged sectional view of area C of the nonaqueous electrolyte battery shown in FIG. 1. In the example of FIGS. 1 and 3, the end of the positive electrode 5 protrudes further than the end of the negative electrode 3, and the end 18 of the separator 4 protrudes further than the end of the positive electrode 5 at the outer end (winding end) of the electrode group 1.

The separator includes a region 11 which is positioned between the negative electrode 3 and positive electrode 5. The end of the region 11 may be a portion corresponding to the end of the negative electrode 3 at the outer end (winding end) of the electrode group 1 in FIGS. 1 and 3. The portion corresponding to the end of the negative electrode 3 may be a portion of the separator in contact with the end of the negative electrode 3. In the structure in which the end of the negative electrode 3 protrudes further than the end of the positive electrode 5 at the winding end of the electrode group 1, the end of the region 11 is a portion corresponding to the end of the positive electrode 5 at the winding end. The portion of the separator 4 in FIG. 2 positioned between the container member 2 and negative electrode current collector 3*a* is not positioned between the negative electrode 3 and positive electrode 5, or in other words, this portion is not included in the region 11.

The separator 4 has a surface in contact with the negative electrode 3. At least part of this surface is located in the region 11. The surface in contact with the negative electrode 3 may also extend outside the region 11. At least part of the surface in contact with the negative electrode 3 is included in the region 11.

The region 11 includes an outermost layer 12. One end 16 of the outermost layer 12 may be the end of the region 11. In the electrode group 1 in FIGS. 1 and 3, the other end 17 of the outermost layer 12 is provided at a position of one layer inside the outermost layer 12, where it corresponds to the position of the end 16 of the outermost layer. FIGS. 1 and 3 show this end 16 of the outermost layer 12 and a dashed two-dotted extension line extending from the end 16. The position of the other end 17 corresponds to the position of the end 16 of the outermost layer may be indicated by an intersecting point of the dashed two-dotted line and the separator 4 of one layer inside the outermost layer 12 in the electrode group 1.

The inner layer 13 is the portion of the region 11 other than the outermost layer 12. The other end 17 of the outermost layer 12 is one end of the inner layer 13.

Figure 4:
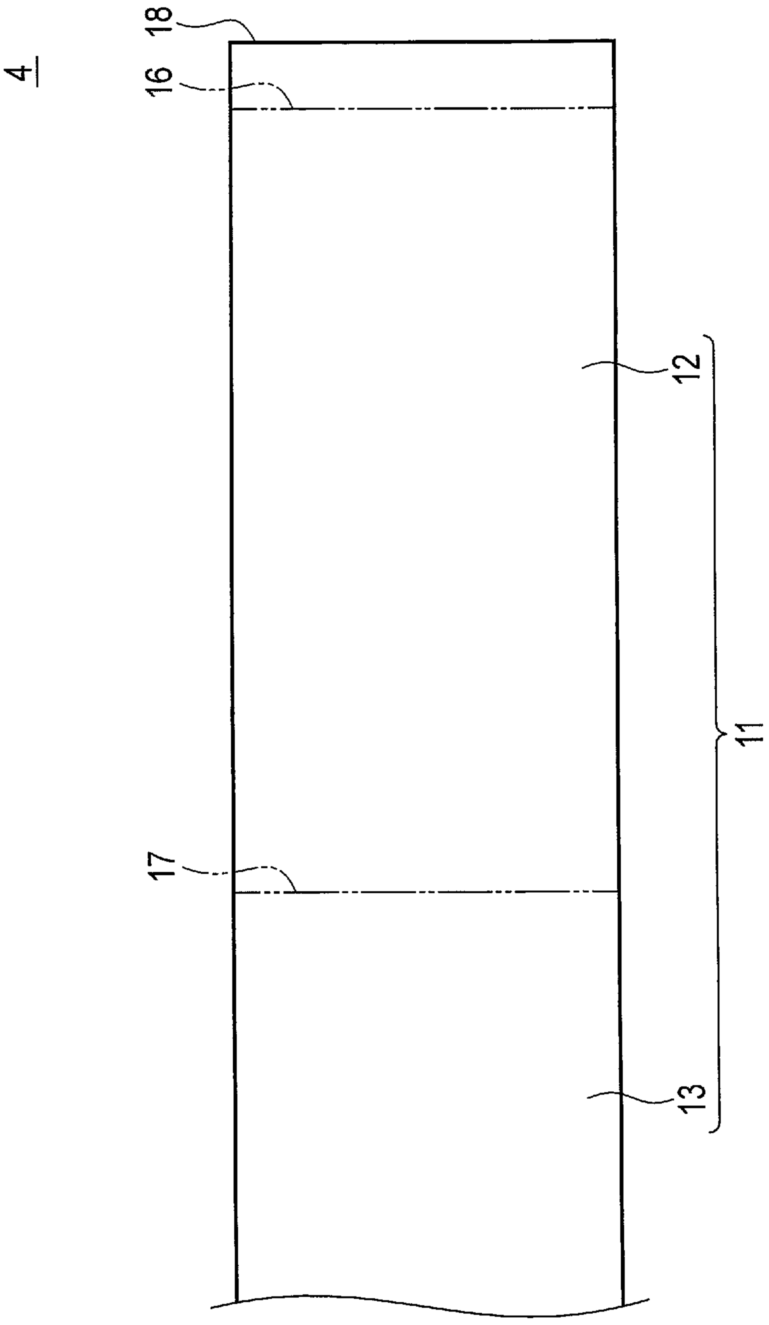
FIG. 4 is a diagram schematically showing an exemplary separator included in the nonaqueous electrolyte battery according to the present embodiment.

FIG. 4 is a diagram schematically showing an exemplary separator included in the wound electrode group of FIGS. 1 to 3 and having the outermost layer 12 and inner layer 13. The separator of FIG. 4 includes portions other than the region 11. The separator, however, may be formed to include the region 11 only.

Figure 5:
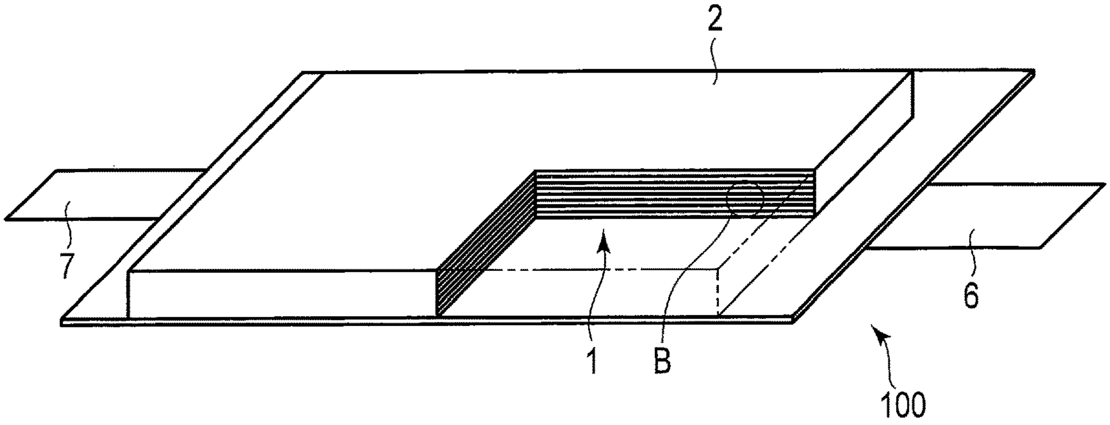
FIG. 5 is a partial cutaway perspective view schematically showing another exemplary nonaqueous electrolyte battery according to the present embodiment.
Figure 6:
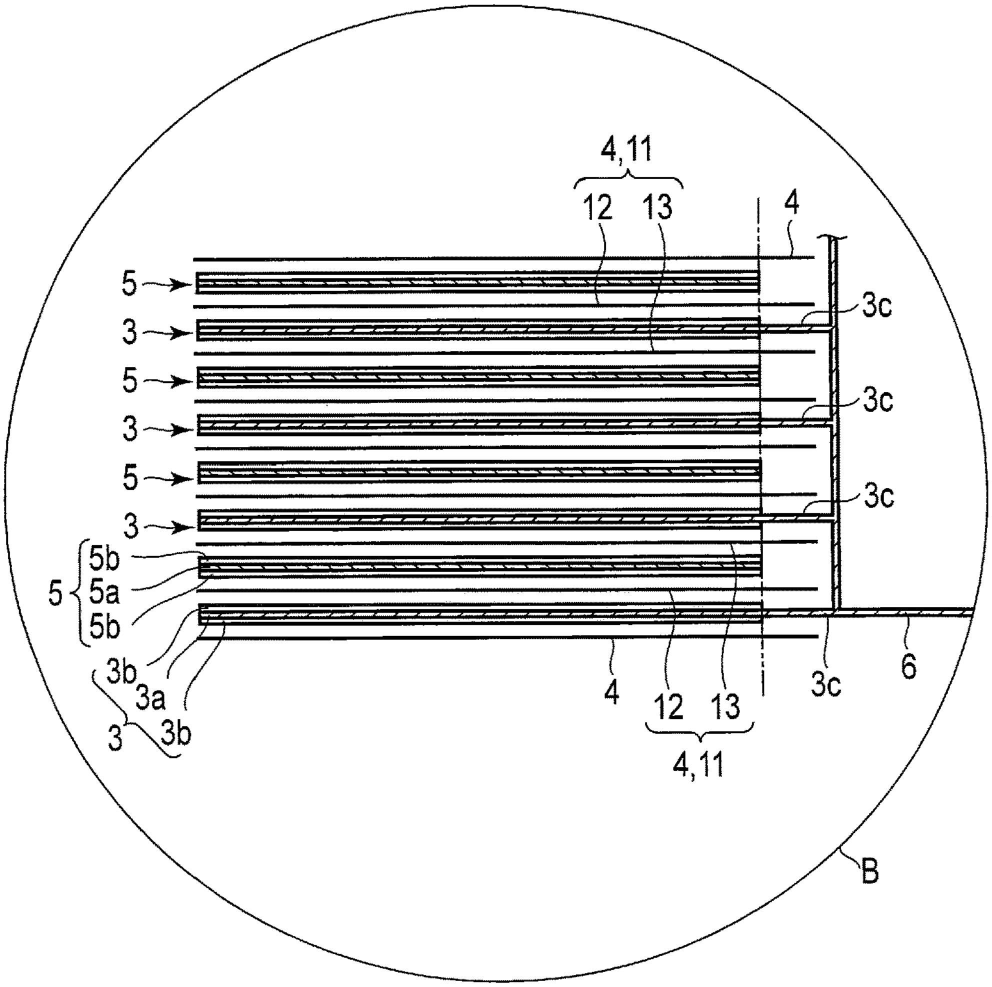
FIG. 6 is an enlarged sectional view of area B of the nonaqueous electrolyte battery shown in FIG. 5.

The nonaqueous electrolyte battery according to the present embodiment is not limited to the nonaqueous electrolyte battery illustrated in FIGS. 1 to 3, and may be a battery having a structure shown in FIGS. 5 and 6.

FIG. 5 is a partial cutaway perspective view schematically showing another exemplary nonaqueous electrolyte battery. FIG. 6 is an enlarged sectional view of area B of the nonaqueous electrolyte battery shown in FIG. 5.

The nonaqueous electrolyte battery 100 of FIGS. 5 and 6 includes an electrode group 1 in FIGS. 5 and 6, a container member 2 in FIG. 5, and an electrolyte that is not shown. The electrode group 1 and electrolyte are accommodated in the container member 2. The electrolyte is retained in the electrode group 1.

The container member 2 is made of a laminate film including two resin layers and a metal layer interposed between the resin layers.

As illustrated in FIG. 6, the electrode group 1 is a stacked-type electrode group. This stacked electrode group 1 has a structure in which negative electrodes 3 and positive electrodes 5 are alternately stacked with a separator 4 interposed.

The electrode group 1 includes a plurality of negative electrodes 3. Each of the negative electrodes 3 includes a negative electrode current collector 3*a* and negative electrode active material containing layers 3*b* held on both of the reverse surfaces of the negative electrode current collector 3*a*. The electrode group 1 further includes a plurality of positive electrodes 5. Each of the positive electrodes 5 includes a positive electrode current collector 5*a* and positive electrode active material containing layers 5*b* held on both of the reverse surfaces of the positive electrode current collector 5*a*.

The negative electrode current collector 3*a* of each negative electrode 3 includes, at its one end, a portion that does not hold a negative electrode active material containing layer 3*b* on either surface of the negative electrode current collector 3*a*. This portion serves as a negative electrode current collector tab 3*c*. As illustrated in FIG. 6, the negative electrode current collector tab 3*c* does not overlap a positive electrode 5. A plurality of negative electrode current collector tabs 3*c* is electrically connected to a band-like negative electrode terminal 6. The band-like negative electrode terminal 6 has a leading end that is pulled out of the container member 2.

Moreover, the positive electrode current collector 5*a* of each positive electrode 5 includes, at its one end, a portion that does not hold a positive electrode active material containing layer 5*b* on either surface of the positive electrode current collector 5*a*, although it is not shown. This portion serves as a positive electrode current collector tab. In a manner similar to the negative electrode current collector tab 3*c*, the positive electrode current collector tab does not overlap a negative electrode 3. The positive electrode current collector tab is positioned on the opposite side of the electrode group 1 with reference to the negative electrode current collector tab 3*c*. The positive electrode current collector tab is electrically connected to the band-like positive electrode terminal 7. The band-like positive electrode terminal 7 has a leading end positioned on the opposite side with reference to the negative electrode terminal 6, and is pulled out of the container member 2.

The separators each include a region 11 positioned between the negative electrode 3 and positive electrode 5. The separators have a surface in contact with the negative electrode 3. Part of this surface is included in the region 11. The surface in contact with the negative electrode 3 may also extend outside the region 11. At least part of the surface of the separators in contact with negative electrode 3 is included in the region 11. In the stacked electrode group 1 of FIGS. 5 and 6, however, the uppermost separator and the lowermost separator are not positioned between the negative electrode 3 and positive electrode 5. These two separators therefore do not include a region 11.

As illustrated in FIG. 6, the uppermost separator 4 is in contact with the positive electrode 5. This positive electrode is the outermost (topmost) positive electrode in the electrode group. The lowermost separator 4 is in contact with the negative electrode 3. This negative electrode is the outermost (bottommost) negative electrode in the electrode group.

The stacked electrode group 1 includes two outermost layers 12. One of the outermost layers 12 is positioned in the upper portion and the other one is positioned in the lower portion in FIG. 6. The outermost layer 12 in the upper portion is a region of the separator in contact with the outermost (uppermost) positive electrode in the electrode group, positioned between this positive electrode and the negative electrode 3. The bottom outermost layer 12 is a region of the separator in contact with the outermost (lowermost) negative electrode in the electrode group, positioned between this negative electrode and the positive electrode 5.

Of the separators arranged inside the above two outermost layers 12 with respect to the laminated direction of the electrode group, the regions positioned between the positive electrode and negative electrode are referred to as inner layers 13. That is, the inner layers 13 are portions of the regions 11 between the positive electrode and negative electrode excluding the outermost layers 12.

The negative electrode, positive electrode, electrolyte, separator, container member, negative electrode terminal, and positive electrode terminal will be described in detail below.

1) Negative Electrode

The negative electrode may include a negative electrode current collector and a negative electrode active material-containing layer. The negative electrode active material-containing layer may be famed on one surface or both surfaces of the negative electrode current collector. The negative electrode active material-containing layer may include a negative electrode active material, and optionally an electro-conductive agent and a binder.

Examples of the negative electrode active material include lithium titanate having a ramsdellite structure (e.g., $Li_{2+y}Ti_3O_7$ where $0 \le y \le 3$), lithium titanate having a spinel structure (e.g., $Li_{4+x}Ti_5O_{12}$ where $0 \le x \le 3$), titanium dioxide ($TiO_2$), anatase titanium dioxide, rutile titanium dioxide, niobium pentoxide ($Nb_2O_5$), hollandite titanium composite oxide, orthorhombic titanium composite oxide, and monoclinic niobium-titanium oxide. One or more kinds of negative electrode active materials may be adopted.

Examples of the orthorhombic titanium composite oxide include any compound represented by $Li_{2+a}M^{I}_{2-b}Ti_{6-c}M^{II}_{d}O_{14+\sigma}$, where $M^I$ is at least one selected from the group consisting of Sr, Ba, Ca, Mg, Na, Cs, Rb, and K, and $M^{II}$ is at least one selected from the group consisting of Zr, Sn, V, Nb, Ta, Mo, W, Y, Fe, Co, Cr, Mn, Ni, and Al. The respective subscripts in the composition formula are specified as $0 \le a \le 6$, $0 \le b < 2$, $0 \le c < 6$, $0 \le d < 6$, and $-0.5 \le \sigma \le 0.5$. A specific example of the orthorhombic titanium composite oxide is $Li_{2+a}Na_2Ti_6O_{14}$ (where $0 \le a \le 6$).

Examples of the monoclinic niobium-titanium oxides include any compound represented by $Li_xTi_{1-y}M1_yNb_{2-z}M2_zO_{7+\delta}$, where M1 is at least one selected from the group consisting of Zr, Si, and Sn, and M2 is at least one selected from the group consisting of V, Ta, and Bi. The respective subscripts in the composition formula are specified as $0 \le x \le 5$, $0 \le y < 1$, $0 \le z < 2$, and $-0.3 \le \delta \le 0.3$. A specific example of the monoclinic niobium-titanium oxide is $Li_xNb_2TiO_7$ (where $0 \le x \le 5$).

Other examples of the monoclinic niobium-titanium oxides include any compound represented by $Li_xTi_{1-y}M3_{y+z}Nb_{2-z}O_{7-\delta}$, where M3 is at least one selected from the group consisting of Mg, Fe, Ni, Co, W, Ta, and Mo. The respective subscripts in the composition formula are specified as $0 \le x \le 5$, $0 \le y < 1$, $0 \le z < 2$, and $-0.3 \le \delta \le 0.3$.

The electro-conductive agent is incorporated so as to improve the current collection performance and also to suppress the contact resistance between the negative electrode active material and negative electrode current collector. Examples of the electro-conductive agent include carbonaceous substances such as vapor grown carbon fiber (VGCF), acetylene black or other carbon blacks, graphite, carbon nanotubes, and nanofibers. One of these substances may be adopted as an electro-conductive agent, or two or more substances may be combined to be used as an electro-conductive agent. Alternatively, in place of the electro-conductive agent, a carbon coating or electro-conductive inorganic material coating may be applied to the surface of negative electrode active material particles.

The binder is incorporated so as to fill gaps among the dispersed negative electrode active material and also to bind the negative electrode active material with the negative electrode current collector. Examples of the binder include polytetrafluoro ethylene (PTFE), polyvinylidene fluoride (PVdF), fluorine rubber, styrene-butadiene rubber, polyacrylate compounds, imide compounds, carboxymethyl cellulose (CMC), and salts of CMC. One of these substances may be adopted as a binder, or two or more substances may be combined to be used as a binder.

The blending proportion of the negative electrode active material, electro-conductive agent, and binder in the negative electrode active material-containing layer may be appropriately changed in accordance with the use of the negative electrode. For instance, if the negative electrode is meant for a nonaqueous electrolyte battery, it is preferable that the negative electrode active material, electro-conductive agent, and binder be blended in respective proportions of 68% by weight to 96% by weight, 2% by weight to 30% by weight, and 2% by weight to 30% by weight. With the amount of electro-conductive agent determined to be 2% by weight or more, the current collection performance of the negative electrode active material-containing layer can be improved. With the amount of binder determined to be 2% by weight or more, sufficient binding can be achieved between the negative electrode active material-containing layer and negative electrode current collector, and excellent cycle performance can be thereby expected. To increase the battery capacity, however, it is preferable that the amount of electro-conductive agent and the amount of binder respectively each be 30% by weight or less.

For the negative electrode current collector, a material that demonstrates electrochemical stability at a potential at which the lithium (Li) is inserted to and extracted from the negative electrode active material is adopted. For instance, the negative electrode current collector is preferably famed of copper, nickel, stainless steel or aluminum, or an aluminum alloy containing one or more elements selected from the group consisting of Mg, Ti, Zn, Mn, Fe, Cu, and Si. The thickness of the negative electrode current collector is preferably 5 μm to 20 μm. With a negative electrode current collector having such a thickness, the negative electrode exhibits a strength and weight reduction that are well-balanced.

The negative electrode current collector may include a portion having no negative electrode active material-containing layer formed on its surface. This portion may serve as a negative electrode current collector tab.

The negative electrode may be prepared by the method as described below. First, the negative electrode active material, the electro-conductive agent, and the binder are suspended in a solvent to prepare a slurry. The slurry is applied onto one or both surfaces of the negative electrode current collector. Then, the applied slurry is dried to obtain a layered stack of a negative electrode active material-containing layer and the negative electrode current collector. Thereafter, this stack is subjected to pressing. The preparation of a negative electrode is completed in this manner.

Alternatively, the negative electrode may be prepared by the method as described below. First, the negative electrode active material, electro-conductive agent, and binder may be mixed to obtain a mixture. Next, pellets are famed from this mixture. These pellets are provided on the negative electrode current collector to obtain a negative electrode.

It is preferable that the negative electrode active material-containing layer (not including the negative electrode current collector) demonstrate a density of 1.8 g/cm$^3$ to 2.8 g/cm$^3$. A negative electrode having a negative electrode active material-containing layer of a density that falls within this range is excellent in energy density and electrolyte retaining capability. It is further preferable that the negative electrode active material-containing layer demonstrate a density of 2.1 g/cm$^3$ to 2.6 g/cm$^3$.

2) Positive Electrode

The positive electrode may include a positive electrode current collector and a positive electrode active material-containing layer. The positive electrode active material-containing layer may be famed on one surface or both surfaces of the positive electrode current collector. The positive electrode active material-containing layer may include a positive electrode active material, and optionally an electro-conductive agent and a binder.

For the positive electrode active material, an oxide or a sulfide may be adopted. The positive electrode may include, as the positive electrode active material, one kind of compound alone or two or more kinds of compounds in combination. Examples of the oxide and sulfide include compounds into which Li or Li ions can be inserted and from which they can be extracted.

Examples of such compounds include manganese dioxide ($MnO_2$), iron oxide, copper oxide, nickel oxide, lithium manganese composite oxides (e.g., $Li_xMn_2O_4$ or $Li_xMnO_2$, where $0<x\leq1$), lithium nickel composite oxides (e.g., $Li_xNiO_2$, where $0<x\leq1$), lithium cobalt composite oxides (e.g., $Li_xCoO_2$, where $0<x\leq1$), lithium nickel cobalt composite oxides (e.g., $Li_xNi_{1-y}Co_yO_2$, where $0<x\leq1$, $0<y<1$), lithium manganese cobalt composite oxides (e.g., $Li_xMn_yCo_{1-y}O_2$, where $0<x\leq1$, $0<y<1$), lithium manganese nickel composite oxides having a spinel structure (e.g., $Li_xMn_{2-y}Ni_yO_4$, where $0<x\leq1$, $0<y<2$), lithium phosphorus oxides having an olivine structure (e.g., $Li_xFePO_4$, where $0<x\leq1$, $Li_xFe_{1-y}Mn_yPO_4$, where $0<x\leq1$, $0<y\leq1$, or $Li_xCoPO_4$, where $0<x\leq1$), ferrous sulfate ($Fe_2(SO_4)_3$) vanadium oxide (e.g., $V_2O_5$), and lithium nickel cobalt manganese composite oxides ($Li_xNi_{1-y-z}Co_yMn_zO_2$, where $0<x\leq1$, $0<y<1$, $0<z<1$, $y+z<1$).

Among the above compounds, examples of more preferred compounds for the positive electrode active material include lithium manganese composite oxides having a spinel structure (e.g., $Li_xMn_2O_4$, where $0<x\leq1$), lithium nickel composite oxides (e.g., $Li_xNiO_2$, where $0<x\leq1$), lithium cobalt composite oxides (e.g., $Li_xCoO_2$, where $0<x\leq1$), lithium nickel cobalt composite oxides (e.g., $Li_xNi_{1-y}Co_yO_2$, where $0<x\leq1$, $0<y<1$), lithium manganese nickel composite oxides having a spinel structure (e.g., $Li_xMn_{2-y}Ni_yO_4$, where $0<x\leq1$, $0<y<2$), lithium manganese cobalt composite oxides (e.g., $Li_xMn_yCo_{1-y}O_2$, where $0<x\leq1$, $0<y<1$), lithium iron phosphates (e.g., $Li_xFePO_4$, where $0<x\leq1$), and lithium nickel cobalt manganese composite oxides ($Li_xNi_{1-y-z}Co_yMn_zO_2$, where $0<x\leq1$, $0<y<1$, $0<z<1$, $y+z<1$). The use of any of these compounds as a positive electrode active material can increase the potential of the positive electrode.

With the use of a room-temperature molten salt as the electrolyte of a battery, it is preferable that a positive electrode active material including lithium iron phosphate, $Li_xVPO_4F$ (where $0\leq x\leq1$), lithium manganese composite oxide, lithium nickel composite oxide, lithium nickel cobalt composite oxide, or a mixture thereof, be used. These compounds demonstrate a low reactivity with the room-temperature molten salt, and thus can improve the cycle life of the battery. The details of the room-temperature molten salt will be provided later.

It is preferable that the primary particle of the positive electrode active material be 100 nm to 1 μm. A positive electrode active material having a primary particle size of 100 nm or larger is easy to handle during industrial production. The positive electrode active material having a primary particle size of 1 μm or smaller contributes to the smooth solid diffusion of lithium ions.

It is preferable that the positive electrode active material have a specific surface area of 0.1 $m^2/g$ to 10 $m^2/g$. The positive electrode active material having a specific surface of 0.1 $m^2/g$ or larger ensures a sufficient Li-ion occlusion/extraction site. The positive electrode active material having a specific surface of 10 $m^2/g$ or smaller makes it easy to handle during industrial production, and gives it an excellent charge/discharge cycle performance.

The binder is incorporated so as to fill gaps among the dispersed positive electrode active material and also to bind the positive electrode active material with the positive electrode current collector. Examples of the binder include polytetrafluoro ethylene (PTFE), polyvinylidene fluoride (PVdF), fluorine rubber, polyacrylate compounds, imide compounds, carboxymethyl cellulose (CMC), and salts of CMC. One of these substances may be adopted as a binder, or two or more substances may be combined to be used as a binder.

The electro-conductive agent is incorporated to improve the current collection performance, and also to suppress the contact resistance between the positive electrode active material and positive electrode current collector. Examples of the electro-conductive agent include carbonaceous substances such as vapor grown carbon fiber (VGCF), acetylene black and other carbon blacks, and graphite. One of these substances may be adopted as an electro-conductive agent, or two or more substances may be combined to be used as an electro-conductive agent. Alternatively, the electro-conductive agent may be omitted.

In the positive electrode active material-containing layer, the positive electrode active material and binder are preferably blended in proportions of 80% by weight to 98% by weight, and 2% by weight to 20% by weight, respectively.

With the amount of the binder determined being 2% by weight or more, a sufficient electrode strength can be achieved. The binder may serve also as an insulator. With the amount of binder determined being 20% by weight or less, the amount of insulator in the electrode can be reduced, as a result of which the internal resistance can be reduced.

If an electro-conductive agent is to be added, it is preferable that the positive electrode active material, binder, and electro-conductive agent be blended in proportions of 77% by weight to 95% by weight, 2% by weight to 20% by weight, and 3% by weight to 15% by weight, respectively.

The above described effects can be attained by setting the amount of the electro-conductive agent to 3% by weight or more. Furthermore, the proportion of the electro-conductive agent in contact with the electrolyte can be lowered by setting the amount of the electro-conductive agent to 15% by weight or less. With this proportion being low, the decomposition of the electrolyte can be suppressed during storage at a high temperature.

The positive electrode current collector is preferably an aluminum foil, or an aluminum alloy foil containing one or more elements selected from the group consisting of Mg, Ti, Zn, Ni, Cr, Mn, Fe, Cu and Si.

It is preferable that the aluminum foil or aluminum alloy foil demonstrate a thickness of 5 μm to 20 μm, and more preferably, 15 μm or less. The purity of the aluminum foil is preferably 99% by weight or more. The content of transition metal such as iron, copper, nickel, or chromium in the aluminum foil or aluminum alloy foil is 1% by weight or less.

The positive electrode current collector may include a portion having no positive electrode active material-containing layer on the surface thereof. This portion may serve as a positive electrode current collecting tab.

The positive electrode may be produced using the positive electrode active material, for example, by a method similar to the method for the negative electrode.

3) Electrolyte

As an electrolyte, a liquid nonaqueous electrolyte or a gel nonaqueous electrolyte may be adopted. The liquid nonaqueous electrolyte is prepared by dissolving an electrolyte salt as a solute into an organic solvent. The electrolyte salt preferably has a concentration of 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$, lithium trifluoromethanesulfonate ($LiCF_3SO_3$), and lithium bistrifluoromethylsulfonylimide ($LiN(CF_3SO_2)_2$), and mixtures thereof. The electrolyte salt is preferably highly resistant to oxidation even at a high potential, and is most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); linear ethers such as dimethoxy ethane (DME) and diethoxy ethane (DEE); and γ-butyrolactone (GBL), acetonitrile (AN), and sulfolane (SL). These organic solvents may be used alone or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), and polyethylene oxide (PEO), or mixtures thereof.

In place of the liquid nonaqueous electrolyte or gel nonaqueous electrolyte, a room-temperature molten salt (ionic melt) containing lithium ions, a polymer solid electrolyte, an inorganic solid electrolyte, or the like may be adopted for a nonaqueous electrolyte. One or more kinds of nonaqueous electrolytes may be adopted.

A room-temperature molten salt (ionic melt) denotes a compound that exists in a liquid state at room temperature (15° C. to 25° C.), selected from organic salts made of combinations of organic cations and anions. The room-temperature molten salts include a room-temperature molten salt of a type that exists itself as a liquid, a room-temperature molten salt of a type that becomes a liquid upon being mixed with an electrolyte salt, a room-temperature molten salt of a type that becomes a liquid upon being dissolved in an organic solvent, and mixtures thereof. In general, the room-temperature molten salt used in nonaqueous electrolyte batteries exhibits a melting point of 25° C. or below. The organic cations generally have a quaternary ammonium framework.

The polymer solid electrolyte is prepared by dissolving an electrolyte salt in a polymeric material and solidifying it.

The inorganic solid electrolyte is a solid substance demonstrating Li-ion conductivity. Li-ion conductivity here indicates conduction of lithium ions at $1\times10^{-6}$ S/cm under the temperature of 25° C. As an inorganic solid electrolyte, an oxide-based solid electrolyte or sulfide-based solid electrolyte may be adopted. Specific examples of the inorganic solid electrolyte are indicated below.

As an oxide-based solid electrolyte, it is preferable that a lithium phosphoric acid solid electrolyte having a structure of a sodium (Na) super ionic conductor (NASICON) type and represented by a general formula of $Li_{1+x}M\alpha_2(PO_4)_3$ be adopted. Ma in the above-described general formula may be at least one element selected from the group consisting of titanium (Ti), germanium (Ge), strontium (Sr), zirconium (Zr), tin (Sn), aluminum (Al), and calcium (Ca). The subscript x falls within the range of $0\leq x\leq 2$.

Specific examples of the lithium phosphoric acid solid electrolyte of a NASICON-type structure include an LATP compound expressed as $Li_{1+x}Al_xTi_{2-x}(PO_4)_3$, where $0.1\leq x\leq 0.5$; a compound expressed as $Li_{1+x}Al_yM\beta_{2-y}(PO_4)_3$, where Mβ is at least one element selected from the group consisting of Ti, Ge, Sr, Zr, Sn, and Ca, where $0\leq x\leq 1$, and $0\leq y\leq 1$; a compound expressed as $Li_{1+x}Al_xGe_{2-x}(PO_4)_3$, where $0\leq x\leq 2$; a compound expressed as $Li_{1+x}Al_xZr_{2-x}(PO_4)_3$, where $0\leq x\leq 2$; a compound expressed as $Li_{1+x+y}Al_xM\gamma_{2-x}Si_yP_{3-y}O_{12}$, where Mγ is at least one element selected from the group consisting of Ti and Ge, where $0<x\leq 2$ and $0\leq y<3$; and a compound expressed as $Li_{1+2x}Zr_{1-x}Ca_x(PO_4)_3$, where $0\leq x<1$.

In addition to the above lithium phosphoric acid solid electrolytes, the following compounds may be adopted as an oxide-based solid electrolyte: an amorphous LIPON compound expressed as $Li_xPO_yN_z$, where $2.6\leq x\leq 3.5$, $1.9\leq y\leq 3.8$, and $0.1\leq z\leq 1.3$ (e.g., $Li_{2.9}PO_{3.3}N_{0.46}$); a compound of a garnet structure expressed as $La_{5+x}A_xLa_{3-x}M\delta_2O_{12}$, where A is at least one element selected from the group consisting of Ca, Sr, and Ba, Mδ is at least one element selected from the group consisting of Nb and Ta, and $0\leq x\leq 0.5$; a compound expressed as $Li_3M\delta_{2-x}L_2O_{12}$, where Mδ is at least one element selected from the group consisting of Nb and Ta, L may include Zr, and $0\leq x\leq 0.5$; a compound expressed as $Li_{7-3x}Al_xLa_3Zr_3O_{12}$, where $0\leq x\leq 0.5$; an LLZ compound expressed as $Li_{5+x}La_3M\delta_{2-x}Zr_xO_{12}$, where Mδ is at least one element selected from the group consisting of Nb and Ta, and $0\leq x\leq 2$ (e.g., $Li_7La_3Zr_2O_{12}$); and a compound of a perovskite structure expressed as $La_{2/3-x}Li_xTiO_3$, where $0.3\leq x\leq 0.7$.

One or more of the above compounds can be used as a solid electrolyte. Two or more solid electrolytes may be adopted.

The electrolyte may include metal ions released due to the oxidization of the aforementioned impurities. Examples of such metal ions include Co ions, Fe ions, Cu ions, Ni ions, and Mn ions. The electrolyte may include one type, or two or more types, of metal ions.

4) Separator

The separator includes a metal-element containing portion on the surface that is in contact with the negative electrode.

The separator may be a sheet with two main surfaces. The surface in contact with the negative electrode may be included in at least one of the main surfaces of the separator. The surface in contact with the negative electrode may be in both main surfaces of the separator. It is preferable, however, that the portion of the separator having one main surface in contact with the negative electrode have the other main surface not in contact with the negative electrode.

As described earlier, the separator includes a region between the positive electrode and the negative electrode. At least part of the surface in contact with the negative electrode is present in this region. The surface in contact with the negative electrode may also be present outside the region.

The separator may be made of a porous film or synthetic resin nonwoven fabric including polyethylene (PE), polypropylene (PP), cellulose, or polyvinylidene fluoride (PVdF). From a safety point of view, a porous film formed of polyethylene or polypropylene is preferred, since such a porous film melts at a certain temperature and thereby shuts the current off.

The metal-element containing portion is included in the surface of the separator in contact with the negative electrode. The metal-element containing portion may also be included in the surface of the separator in contact with the positive electrode, and may extend across the entire thickness of the separator. Further, the metal-element containing portion may be present across the negative electrode and separator.

The metal-element containing portion has an area as small as 0.3 $mm^2$ to 3.2 $mm^2$. For this reason, even if the metal-element containing portion protrudes from the separator, this portion produces a small contact interface that can be only loosely attached to the positive electrode. Because of the surface of the positive electrode having a high potential, the metal elements contained in the metal-element containing portion on the surface of the separator in contact with the positive electrode tend to be oxidized and iodized, thereby being dissolved in the electrolyte. This makes the metal-element containing portion having a small area easier to dissolve than to grow. The metal-element containing portions are therefore retarded from becoming in contact with the positive electrode. Even if a metal-element containing portion extends through the separator, an internal short circuit is rarely produced, thereby suppressing self-discharge.

The separator may include a metal-element containing portion, or a plurality of metal-element containing portions.

With a plurality of metal-element containing portions in the separator, the largest one of the metal-element containing portions preferably has an area that falls within the range of 0.3 $mm^2$ to 3.2 $mm^2$.

It is preferable that the separator include a plurality of metal-element containing portions. With multiple metal-element containing portions in the separator, the number of metal precipitation sites can be increased.

With fewer precipitation sites, the metal ions may need to be reduced and precipitated on the precipitation sites. Such precipitation will result in large metallic crystals being formed on the precipitation sites, which can lead to an internal short circuit. With a large number of precipitation sites, the precipitation of the metal ions can be distributed to different precipitation sites. This prevents large metallic crystals from being formed even if the metal ions are reduced. Thus, the separator including a plurality of metal-element containing portions can further suppress internal shorting.

It is preferable that the number of metal-element containing portions per unit area in the outermost layer be larger than that of metal-element containing portions per unit area in an inner layer.

The number of metal-element containing portions per unit area in the outermost layer is preferably 200 or more and 1290 or less per square meter, and is more preferably 200 or more and 1000 or less per square meter. With 200 metal-element containing portions or more per square meter in the outermost layer, a large number of metal precipitation sites can be ensured so that formation of large metallic crystals can be suppressed. This leads to suppression of internal shorting. With 1000 metal-element containing portions or less per square meter in the outermost layer, excessive formation of short-circuiting points can be prevented so that the amount of self-discharge can be suppressed.

The metal-element containing portion may include at least one metal element selected from the group consisting of Co, Fe, Cu, Ni, and Mn.

The inclusion of the metal element may be attributed to impurities mixed in during the production of nonaqueous electrolyte batteries. In the production of nonaqueous electrolyte batteries, foreign substances such as metallic dust may be mixed in as the impurities. The impurities may include the metal elements as mentioned earlier. Co and Fe may be contained in a catalyst used for the production of carbon nanotubes. This catalyst may remain as impurities in the carbon nanotubes. The carbon nanotubes may be added to an electrode to serve as an electro-conductive agent, and therefore Co and Fe may be contained in the nonaqueous electrolyte battery.

The metal-element containing portion may include a metal, a metallic oxide, or a metallic fluoride. The metal-element containing portion may contain one or more of these. Each of the metal, metallic oxide, and metallic fluoride may contain at least one metal element selected from the group consisting of Co, Fe, Cu, Ni, and Mn.

Examples of the metal include a metal that includes at least one metal element selected from the group consisting of Co, Fe, Cu, Ni, and Mn. The metal may contain only one metal element, or two or more metal elements. Examples of the metallic oxide include MO, $M_2O_3$, $M_3O_4$, $M_2O_3$, $F_3O_4$, where M is at least one metal element selected from the group consisting of Co, Fe, Cu, Ni, and Mn. The metal-element containing portion may contain only one of these metallic oxides, or two or more of them. Examples of the metallic fluoride include MF, $MF_2$, $MF_3$, where M is at least one metal element selected from the group consisting of Co, Fe, Cu, Ni, and Mn. The metal-element containing portion may contain only one of these metallic fluorides, or two or more of them.

The metal may singly contain a metal precipitated due to the reduction of metal ions in the electrolyte. The metallic oxide may be an oxide of such precipitated metal. The metallic fluoride may be a fluoride produced by the reaction of hydrogen fluoride and the precipitated metal. The hydrogen fluoride will be discussed later.

The metal-element containing portion may be famed through the precipitation of metal. The metal-element containing portion may be famed through layered sedimentation of at least one component selected from the group consisting of a metal, metallic oxide, and metallic fluoride. The metal-element containing portion may be famed into any desired shape, such as a granule or a stripe.

The metal-element containing portion may or may not exhibit conductivity. From the view point of internal shorting prevention, it is preferable that the metal-element containing portion does not have conductivity.

5) Container Member

As a container member, a container made of a laminate film or a metal container may be adopted.

The laminate film has a thickness of 0.5 mm or less, and preferably 0.2 mm or less.

As a laminate film, a multi-layered film including a plurality of resin layers and metal layers interposed between the resin layers is adopted. A resin layer may contain a polymeric material such as polypropylene (PP), polyethylene (PE), nylon, and polyethylene terephthalate (PET). A metal layer is preferably made of an aluminum foil or aluminum alloy foil for reduction in weight. The laminate film may be shaped into a container member by thermal sealing.

The wall of the metal container has a thickness of 1 mm or less, or preferably 0.5 mm or less, and more preferably 0.2 mm or less.

The metal container may be made of aluminum or an aluminum alloy. The aluminum alloy preferably contains elements such as magnesium, zinc, and silicon. If the aluminum alloy contains a transition metal such as iron, copper, nickel, or chromium, the content thereof is preferably 100 ppm or less by weight.

The shape of the container member is not particularly limited. The container member may be formed into a flat (thin), square, cylindrical, coin-like, or button-like shape. The type of the container member may be suitably selected in accordance with the size and use of the battery.

6) Negative Electrode Terminal

The negative electrode terminal may be formed of a conductive material that exhibits an electrical stability within the potential range of 1 to 3 volts relative to the redox potential of lithium (vs. $Li/Li^+$). Specific examples of the material for the negative electrode terminal include copper, nickel, stainless steel, and aluminum, or an aluminum alloy containing at least one element selected from the group consisting of Mg, Ti, Zn, Mn, Fe, Cu, and Si. Aluminum or an aluminum alloy is preferred as the material for the negative electrode terminal. The negative electrode terminal is preferably made of the same material as the negative electrode current collector so that the contact resistance can be reduced between the negative electrode terminal and the negative electrode current collector.

7) Positive Electrode Terminal

The positive electrode terminal may be famed of a conductive material that exhibits an electrical stability within the potential range of 3 to 4.5 volts relative to the redox potential of lithium (vs. $Li/Li^+$). Examples of the material for the positive electrode terminal include aluminum or an aluminum alloy containing at least one element selected from the group consisting of Mg, Ti, Zn, Mn, Fe, Cu, and Si. The positive electrode terminal is preferably made of the same material as the positive electrode current collector so that the contact resistance can be reduced between the positive electrode terminal and the positive electrode current collector.

(Method for Forming Metal-Element Containing Portions)

The metal-element containing portions may be formed in the manner as indicated below.

First, an electrode group is assembled, to which an electrolyte is injected. By closing the opening of the container member, a nonaqueous electrolyte battery is produced. Thereafter, it is preferable that the nonaqueous electrolyte battery be subjected to a pre-charge retention prior to the initial charging. The pre-charge retention is conducted preferably under a temperature as high as 60° C. to 80° C. for 4 to 48 hours.

During the production of nonaqueous electrolyte batteries, water inevitably enters as impurities. In the reaction of the water and the electrolyte, hydrogen fluoride (HF) may be produced. With this reaction, the water inside the nonaqueous electrolyte battery is consumed, and the resultant hydrogen fluoride may react with the metal element contained in the impurities. As a result, the impurities may be dissolved, and the metal ions may be released into the electrolyte.

The above generation of the hydrogen fluoride and dissolution of impurities may increase exponentially with an increase in temperature. Thus, by conducting the pre-charge retention at 60° C. or higher, the above reaction can be accelerated, and as a result, the metal ion concentration in the electrolyte can be increased.

Metal-element containing portions are difficult to be famed if the metal ion concentration in the electrolyte is below a threshold value. If the metal ion concentration is at or higher than the threshold value, the metal-element containing portions tend to be formed more frequently in accordance with the metal ion concentration. As a result, the number of metal-element containing portions per unit area in the separator increases.

If the metal ion concentration is at or higher than the threshold value but is not sufficiently high, the frequency of the formation of metal-element containing portions tends to stay low. This means that each of the formed metal-element containing portions tends to grow larger.

By conducting pre-charge retention at a high temperature, initial charging can be conducted with a metal ion concentration kept high in the electrolyte. As a result, the metal ion concentration can be sufficiently increased in the entire electrolyte including a region necessary for formation of nuclei of precipitation, and under this environment, an overvoltage electrochemically high enough for metal precipitation can be applied. Thus, minute precipitated portions are frequently famed, increasing the number of metal-element containing portions per unit area in the separator. The number of metal-element containing portions per unit area in the outermost layer of the separator may fall into a preferable range of 200 to 1290 per square meter.

Furthermore, through the pre-charge retention at high temperature, the water inside the nonaqueous electrolyte battery can be consumed before initial charging. The water inside the nonaqueous electrolyte battery remains low in the initial charging and after. Thus, the generation of hydrogen fluoride and dissolution of impurities after the initial charging can be suppressed. This can suppress self-discharge due to the growth of metal-element containing portions, for example, during the storage of batteries after the initial charging and also during charging/discharging.

With the pre-charge retention performed at a temperature of 80° C. or lower, degradation of the electrolyte can be suppressed.

After the pre-charge retention, initial charging can be conducted. The initial charging is preferably conducted at the charging rate of 2 C to 10 C (rapid charging), and at a temperature as low as −20° C. to 0° C. That is, the initial charging is preferably conducted at a high rate and under a low temperature.

With the initial charging conducted at a charging rate as high as 2 C to 10 C, an overvoltage necessary for metal precipitation can be applied. Thus, the metal precipitation can be effectively conducted, and the metal-element containing portions can thereby be effectively famed. Furthermore, with the initial charging conducted at a low temperature, the growth of metal-element containing portions can be suppressed.

It is preferable to conduct pre-charge retention at a high temperature and then conduct initial charging at a high rate and at a low temperature, which can frequently form metal-element containing portions as small as 0.3 $mm^2$ to 3.2 $mm^2$.

A metal-element containing portion that contains a metallic oxide may be formed by precipitating a metal through an electrochemical reduction reaction of the metallic ions dissolved in the electrolyte and oxidizing this metal. A metal-element containing portion that contains a metallic fluoride may be formed, if the electrolyte contains a fluoride containing salt such as $LiPF_6$ or $LiBF_4$ as a Li salt, through a reaction of metallic ions and HF, which is a product of the reaction of the Li salt.

The negative electrode active material preferably contains at least one component selected from the group consisting of titanium oxide and niobium-titanium oxide. Such a negative electrode active material is less reactive with the electrolyte even at a high temperature, and therefore can suppress degradation of the electrolyte during a pre-charge retention at high temperature. Such a negative electrode active material also demonstrates an excellent lithium ion conductivity even at a low temperature, which allows for quick initial charging at a low temperature.

<XRF Analysis>

The compositional analysis of metal-element containing portions, area measurement of metal-element containing portions, and counting of the number of metal-element containing portions per unit area can be conducted with X-ray fluorescence (XRF). In particular, the measurements can be conducted as indicated below.

First, a nonaqueous electrolyte battery is fully discharged, and then is disassembled in a glove box filled with argon to remove the separator. In this separator, its surface facing the negative electrode is subjected to the measurement. Part of the observation-target separator may be cut out, as needed. For instance, the outermost layer and inner layer of the separator may be cut out. The obtained separator is impregnated with ethanol and subjected to ultrasonic cleaning for five minutes. The cleaned separator is then air-dried. If a piece of an electrode is adhered to the separator, this should be removed by high-pressure air or by wiping. In this manner, an observation sample is obtained.

The observation sample is subjected to an XRF analysis under the following conditions.

Tube voltage: 50 kV

Tube current: 1000 ρA

Collimator: 1.2×1.2 mm

Field of view: range of 30 mm×50 mm (276×494 pixels)

The composition of the metal-element containing portion is qualitatively analyzed based on the element mapping data obtained through the XRF.

Thereafter, the XRF mapping image data in a measurement view range is subjected to binarization by ImageJ (version 1.52a). Specifically, the obtained image is converted to a gray-scale image. The median value of the brightness peak maximum of the metal-element containing portion is set to a threshold value with reference to the base material region of the separator as a baseline, and the image data is thereby subjected to binarization. In this binarization, for instance, a region demonstrating a brightness below the threshold value may be expressed in white, while a region demonstrating a brightness equal to or higher than the threshold value may be expressed in black.

The resultant binarized image is subjected to the measurement to find the areas of the metal-element containing portions and the number of metal-element containing portions per unit area. In a binarized image, a portion corresponding to the region with a brightness equal to or higher than the threshold value as described above indicates a metal-element containing portion. The area of a metal-element containing portion is considered to be the area of the largest metal-element containing portion in the observation sample if the observation sample contains a plurality of metal-element containing portions. If the observation sample contains only one metal-element containing portion, the area of this metal-element containing portion is considered to be the area of a metal-element containing portion in the observation sample. Counting of the number of metal-element containing portions per unit area can be conducted on ImageJ using "Analyze Particles". As the conditions of particle detection, size 0-infinity and circularity 0-1 are set. In this manner, the number of bounded black areas, which are areas having a brightness higher than or equal to a threshold value, can be counted in a binarized image.

If a measurement field view is insufficient, the counting may be conducted on multiple fields of view to analyze the entire area of the observation sample. If images of multiple fields of view are obtained, it is preferable that the condition be set to 0.1 mm per pixel or lower so that the boundaries can be accurately extracted at the time of image analysis. With 0.1 mm or larger per pixel, the sizes and boundaries of the detection-target metal-element containing portions may not be acquired with sufficient clearness.

The counting of metal-element containing portions per unit area is conducted in the outermost layer and in an inner layer and the counted numbers are compared so that whether the number of metal-element containing portions per unit area in the outermost layer is larger than the number of metal-element containing portions per unit area in the inner layer can be confirmed.

The nonaqueous electrolyte battery according to the first embodiment includes an electrode group, which includes a positive electrode, a negative electrode, and a separator. The separator includes at least one metal-element containing portion containing a metal element. The at least one metal-element containing portion is provided in the surface of the separator in contact with the negative electrode, where the at least one metal-element containing portion contains at least one selected from a group consisting of a metal, a metallic oxide, and a metallic fluoride. The area of the at least one metal-element containing portion is in the range of 0.3 $mm^2$ or larger and 3.2 $mm^2$ or smaller. Such a nonaqueous electrolyte battery can suppress self-discharge.

Second Embodiment

The second embodiment offers a battery module. This battery module includes a plurality of nonaqueous electrolyte batteries according to the first embodiment.

In such a battery module, the unit-cell batteries may be electrically connected in series, in parallel, or arranged in a combination of in-series connection and parallel connection.

An exemplary battery module according to the present embodiment will be described with reference to the drawings.

Figure 7:
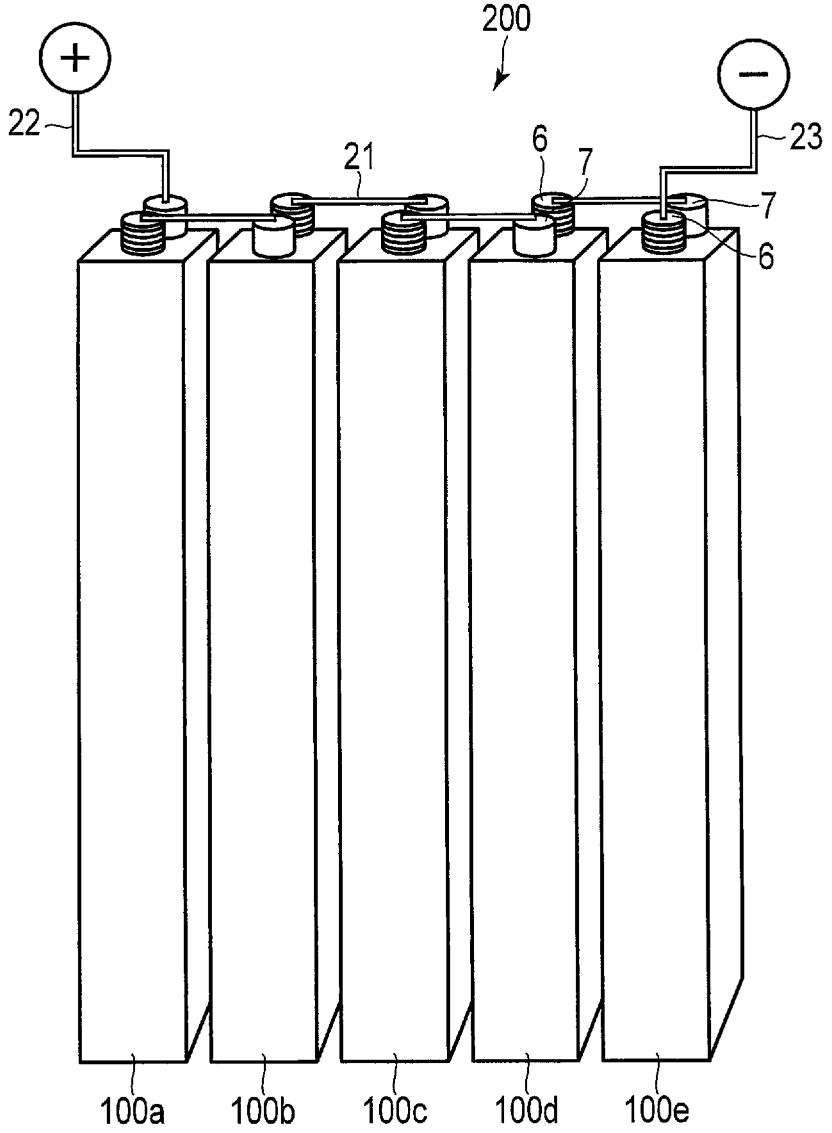
FIG. 7 is a perspective view schematically showing an exemplary battery module according to the present embodiment.

FIG. 7 is a perspective view schematically showing an exemplary battery module. The battery module 200 shown in FIG. 7 includes five unit-cell batteries 100*a* to 100*e*, four bus bars 21, a positive electrode-side lead 22, and a negative electrode-side lead 23. Each of the five unit-cell batteries 100*a* to 100*e* is a nonaqueous electrolyte battery according to the first embodiment.

A bus bar 21 connects, for example, the negative electrode terminal 6 of the unit-cell battery 100*a* with the positive electrode terminal 7 of its adjacent unit-cell battery 100*b*. In this manner, the five unit-cell batteries 100 are connected in series by the four bus bars 21. That is, the battery module 200 of FIG. 7 is a battery module of five-in-series connection. In a battery module that includes multiple unit-cell batteries that are electrically connected in parallel, the negative electrode terminals may be connected to each other via a bus bar, and the positive electrode terminals may be connected to each other via a bus bar so that a mutual electrical connection of the multiple unit-cell batteries can be established, although such a configuration is not illustrated.

The positive electrode terminal 7 of at least one of the five unit-cell batteries 100*a* to 100*e* is electrically connected to the positive electrode-side lead 22 for external connection. Furthermore, the negative electrode terminal 6 of at least one of the five unit-cell batteries 100*a* to 100*e* is electrically connected to the negative electrode-side lead 23 for external connection.

The battery module according to the second embodiment includes nonaqueous electrolyte batteries according to the first embodiment. Thus, self-discharging can be suppressed.

Third Embodiment

The third embodiment offers a battery pack, which includes a battery module according to second embodiment. This battery pack may include a single nonaqueous electrolyte battery according to the first embodiment, in place of the battery module of the second embodiment.

This battery pack may further include a protective circuit. The protective circuit has a function of controlling charging and discharging of the nonaqueous electrolyte batteries. Alternatively, a circuit included in a device that adopts the battery pack as a power source (e.g., electronic devices, automobiles, and the like) may be used as a protective circuit of the battery pack.

Such a battery pack may further include an external power distribution terminal. The external power distribution terminal is designed to output a current from the nonaqueous electrolyte battery to the outside and/or to input an external current to the nonaqueous electrolyte battery. In other words, when the battery pack is used as a power source, a current is supplied through the external power distribution terminal to the outside. When the battery pack is to be charged, a charging current (including regenerative energy of a motive force of an automobile) is supplied to the battery pack through the external power distribution terminal.

An exemplary battery pack according to the present embodiment will be described below with reference to the drawings.

Figure 8:
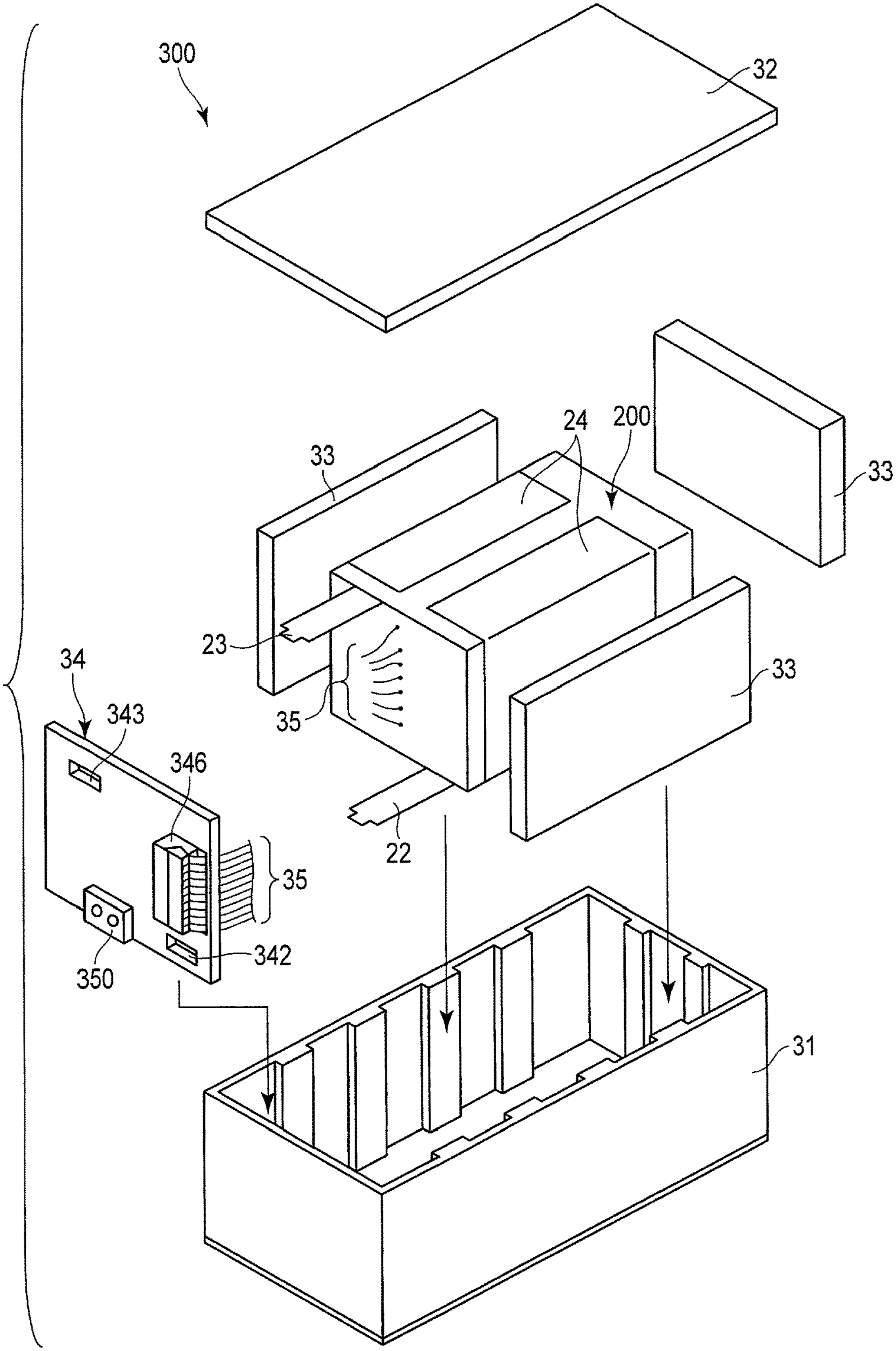
FIG. 8 is an exploded perspective view schematically showing an exemplary battery pack according to the present embodiment.
Figure 9:
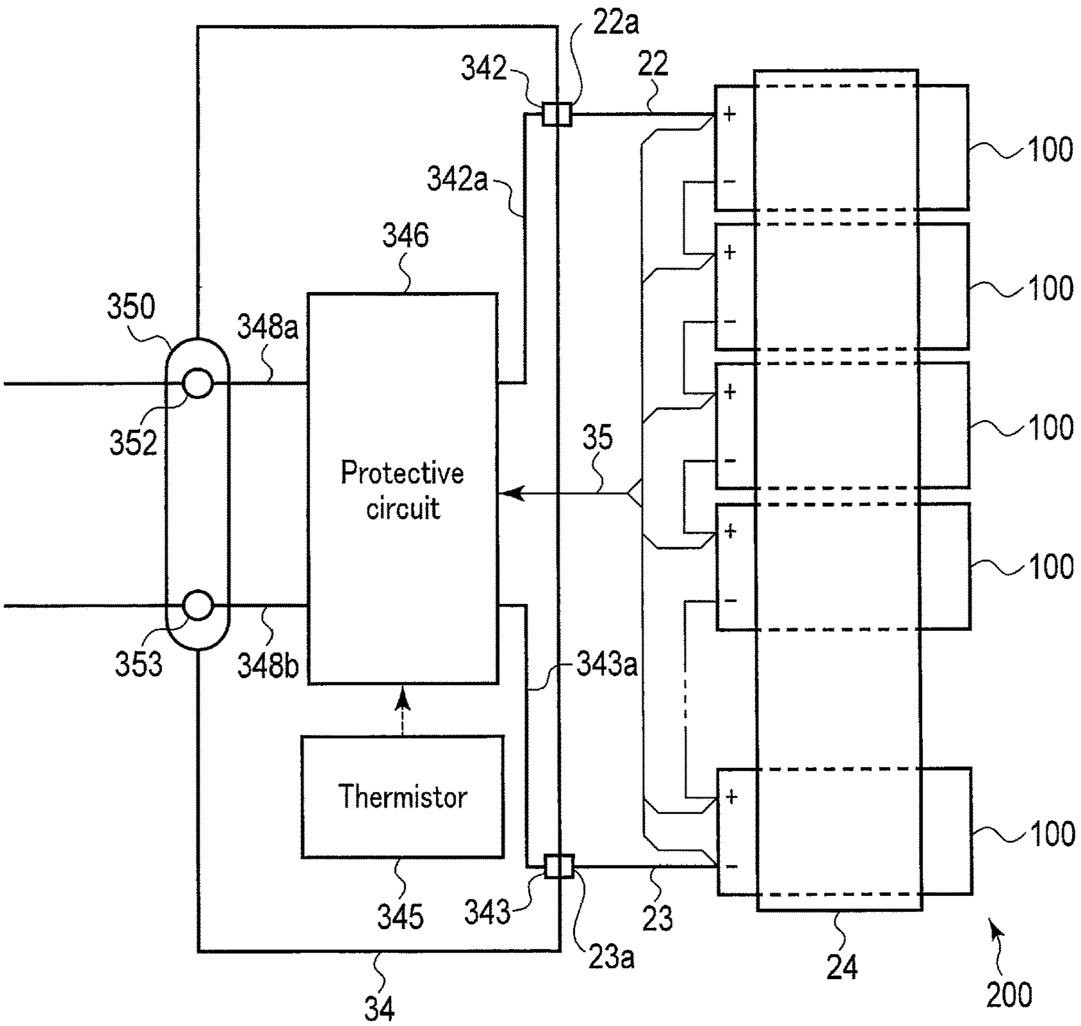
FIG. 9 is a block diagram showing an exemplary electric circuit of the battery pack shown in FIG. 8.

FIG. 8 is an exploded perspective view schematically showing an exemplary battery pack, and FIG. 9 is a block diagram showing an exemplary electric circuit of the battery pack shown in FIG. 8.

The battery pack 300 in FIGS. 8 and 9 includes a housing 31, a lid 32, protective sheets 33, a battery module 200, a printed wiring board 34, wires 35, and an insulating plate (not shown).

The housing 31 in FIG. 8 is a rectangular bottomed container. The housing 31 is designed to accommodate the protective sheets 33, battery module 200, printed wiring board 34, and wires 35. The lid 32 has a rectangular shape, and covers the housing 31 to accommodate the battery module 200. The housing 31 and lid 32 are provided with openings or connection terminals, although not illustrated, so as to establish a connection to an external device or the like.

The battery module 200 includes unit-cell batteries 100, a positive electrode-side lead 22, a negative electrode-side lead 23, and a piece of adhesive tape 24.

At least one of the unit-cell batteries 100 is a nonaqueous electrolyte battery according to the first embodiment. The unit-cell batteries 100 are electrically connected in series, as shown in FIG. 9. The unit-cell batteries 100, however, may be electrically connected in parallel, or connected in a combination of in-series connection and parallel connection. With a parallel connection, the battery capacity increases in comparison with the in-series connection.

The adhesive tape 24 binds the unit-cell batteries 100 to each other. The unit-cell batteries 100 may be secured together with a heat shrinkable tape in place of the adhesive tape 24. In this case, the protective sheets 33 are placed on both side surfaces of the battery module 200, and a heat shrinkable tape is wound around the battery module 200 and then thermally shrunk to bind the unit-cell batteries 100.

One end of the positive electrode-side lead 22 is connected to the battery module 200. This end of the positive electrode-side lead 22 is electrically connected to the positive electrode of the one or more unit-cell batteries 100. One end of the negative electrode-side lead 23 is connected to the battery module 200. This end of the negative electrode-side lead 23 is electrically connected to the negative electrode of one or more unit-cell batteries 100.

The printed wiring board 34 is arranged on the inner surface of the housing 31 along one of the shorter-side surfaces. The printed wiring board 34 includes a positive electrode-side connector 342, a negative electrode-side connector 343, a thermistor 345, a protective circuit 346, wires 342*a* and 343*a*, an external power distribution terminal 350, a plus-side (positive-side) wire 348*a*, and a minus-side (negative-side) wire 348*b*. One of the main surfaces of the printed wiring board 34 faces one of the side surfaces of the battery module 200. An insulating plate (not shown) is interposed between the printed wiring board 34 and battery module 200.

The positive electrode-side lead 22 has another end 22*a* that is electrically connected to the positive electrode-side connector 342. The negative electrode-side lead 23 has another end 23*a* that is electrically connected to the negative electrode-side connector 343.

The thermistor 345 is fixed to one of the main surfaces of the printed wiring board 34. The thermistor 345 is configured to detect the temperatures of the respective unit-cell batteries 100 and transmit the detection signals to the protective circuit 346.

The external power distribution terminal 350 is fixed to the other main surface of the printed wiring board 34. The external power distribution terminal 350 is electrically connected to a device provided outside the battery pack 300. The external power distribution terminal 350 has a positive-side terminal 352 and a negative-side terminal 353.

The protective circuit 346 is fixed to the other main surface of the printed wiring board 34. The protective circuit 346 is connected to the positive-side terminal 352 via the plus-side wire 348*a*. The protective circuit 346 is connected to the negative-side terminal 353 via the minus-side wire 348*b*. The protective circuit 346 is also electrically connected to the positive electrode-side connector 342 via the wire 342*a*. The protective circuit 346 is electrically connected to the negative electrode-side connector 343 via the wire 343*a*. Furthermore, the protective circuit 346 is electrically connected to each of the unit-cell batteries 100 via the wires 35.

The protective sheets 33 are arranged on the two longitudinal side surfaces of the housing 31 and on a shorter side surface of the housing 31 that faces the printed wiring board 34 across the battery module 200. The protective sheets 33 may be formed of resin or rubber.

The protective circuit 346 controls charging and discharging of the unit-cell batteries 100. The protective circuit 346 interrupts the electric connection between the protective circuit 346 and the external power distribution terminal 350 (positive-side terminal 352 and negative-side terminal 353) that passes a current to external devices, based on the detection signals transmitted from the thermistor 345 or detection signals transmitted from the respective unit-cell batteries 100 or the battery module 200.

A detection signal transmitted from the thermistor 345 may be a signal indicating the detection of a temperature of a unit-cell battery 100 equal to or higher than a specific temperature. A detection signal transmitted from a unit-cell battery 100 or battery module 200 may be a signal indicating the detection of over-charge, over-discharge, or overcurrent of the unit-cell battery 100. For the detection of over-charge or the like for a unit-cell battery 100, the voltage of the battery may be detected, or the potential of the positive electrode or negative electrode may be detected. In the latter case, a lithium electrode is inserted into each battery 100 to be used as a reference electrode.

For a protective circuit 346, the circuit included in a device (e.g., electronic devices and automobiles) that uses the battery pack 300 as a power source may be adopted.

As mentioned earlier, the battery pack 300 includes an external power distribution terminal 350. This battery pack 300 therefore can, by way of the external power distribution terminal 350, output a current from the battery module 200 to an external device and input a current from an external device to the battery module 200. In other words, at the time of using the battery pack 300 as a power source, the current from the battery module 200 is supplied to an external device via the external power distribution terminal 350. At the time of charging the battery pack 300, a charging current from an external device is supplied to the battery pack 300 via the external power distribution terminal 350. For use of this battery pack 300 as an in-vehicle battery, the energy regenerated from the motive power of the vehicle may be used as a charging current from an external device.

The battery pack 300 may include a plurality of battery modules 200. In this case, the battery modules 200 may be connected in series or in parallel, or in a combination of in-series connection and parallel connection. The printed wiring board 34 and wires 35 may be omitted. In this case, the positive electrode-side lead 22 and negative electrode-side lead 23 may be used respectively as the positive-side terminal 352 and negative-side terminal 353 of the external power distribution terminal 350.

Such a battery pack may be suitable for a purpose of use where excellent cycle performance is required when drawing a large current. The battery pack of this type may be used particularly for the power source of an electronic device, a stationary battery, or an in-vehicle battery for vehicles of various types. Examples of the electronic devices include a digital camera. This battery pack is particularly favorable as an in-vehicle battery.

The battery pack according to the third embodiment includes a nonaqueous electrolyte battery according to the first embodiment or a battery module according to the second embodiment. In this manner, self-discharge can be suppressed.

Fourth Embodiment

The fourth embodiment offers a vehicle to which a battery pack according to the third embodiment is provided.

The battery pack of this vehicle may be designed to recover the regenerative energy from the motive power of the vehicle. The vehicle may include a mechanism (regenerator) for converting the kinetic energy of this vehicle to regenerative energy.

Examples vehicles may include two- to four-wheeled hybrid electric automobiles, two- to four-wheeled electric automobiles, electric power-assisted bicycles, and trains.

The installing position of the battery pack in the vehicle is not particularly limited. If a battery pack is installed in an automobile, it may be placed in the engine compartment, in the rear part of the body, or underneath the seats of the vehicle.

The vehicle may have multiple battery packs. In this case, the batteries included in the respective battery packs may be electrically connected to each other in series or in parallel, or may be electrically connected in a combination of series connections and parallel connections. If the respective battery packs include battery modules, the battery modules may be electrically connected to each other in series or in parallel, or may be electrically connected in a combination of series connections and parallel connections. If the respective battery packs include a single battery, the batteries may be electrically connected to each other in series or in parallel, or may be electrically connected in a combination of series connections and parallel connections.

An exemplary vehicle according to the present embodiment will be explained below with reference to the drawings.

Figure 10:
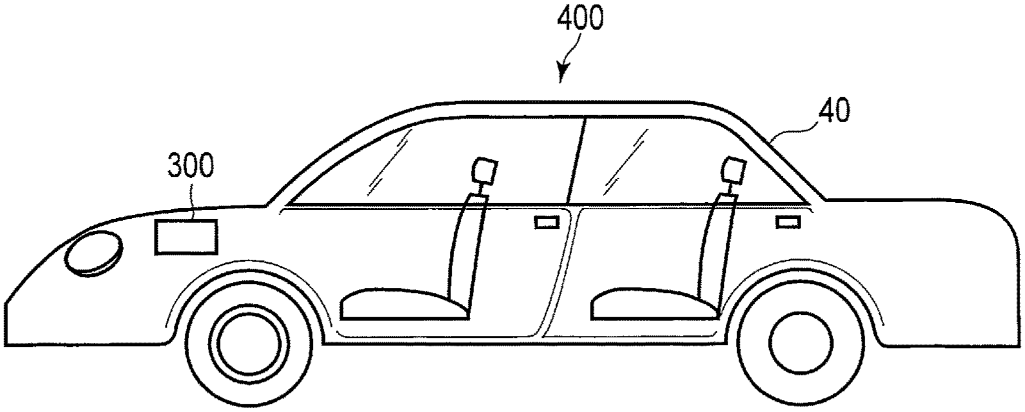
FIG. 10 is a partially transparent diagram schematically showing an exemplary vehicle according to the present embodiment.

FIG. 10 is a partially transparent diagram schematically illustrating an exemplary vehicle.

The vehicle 400 of FIG. 10 includes a vehicle body 40 and a battery pack 300 according to the third embodiment. In the example of FIG. 10, the vehicle 400 is a four-wheeled automobile.

This vehicle 400 may be equipped with multiple battery packs 300. In such a case, the batteries (e.g., unit-cell batteries or battery modules) included in the battery packs 300 may be connected in series or in parallel, or connected in a combination of in series connection and in parallel connection.

In the example of FIG. 10, the battery pack 300 is installed in the engine compartment in the front part of the vehicle body 40. As mentioned earlier, the battery pack 300 may be placed in the rear part of the vehicle body 40 or underneath the seats. This battery pack 300 can be used as a power source of the vehicle 400, and can also recover the regenerative energy regenerated from the motive power of the vehicle 400.

Next, one mode of the vehicle according to the present embodiment will be described with reference to FIG. 11.

Figure 11:
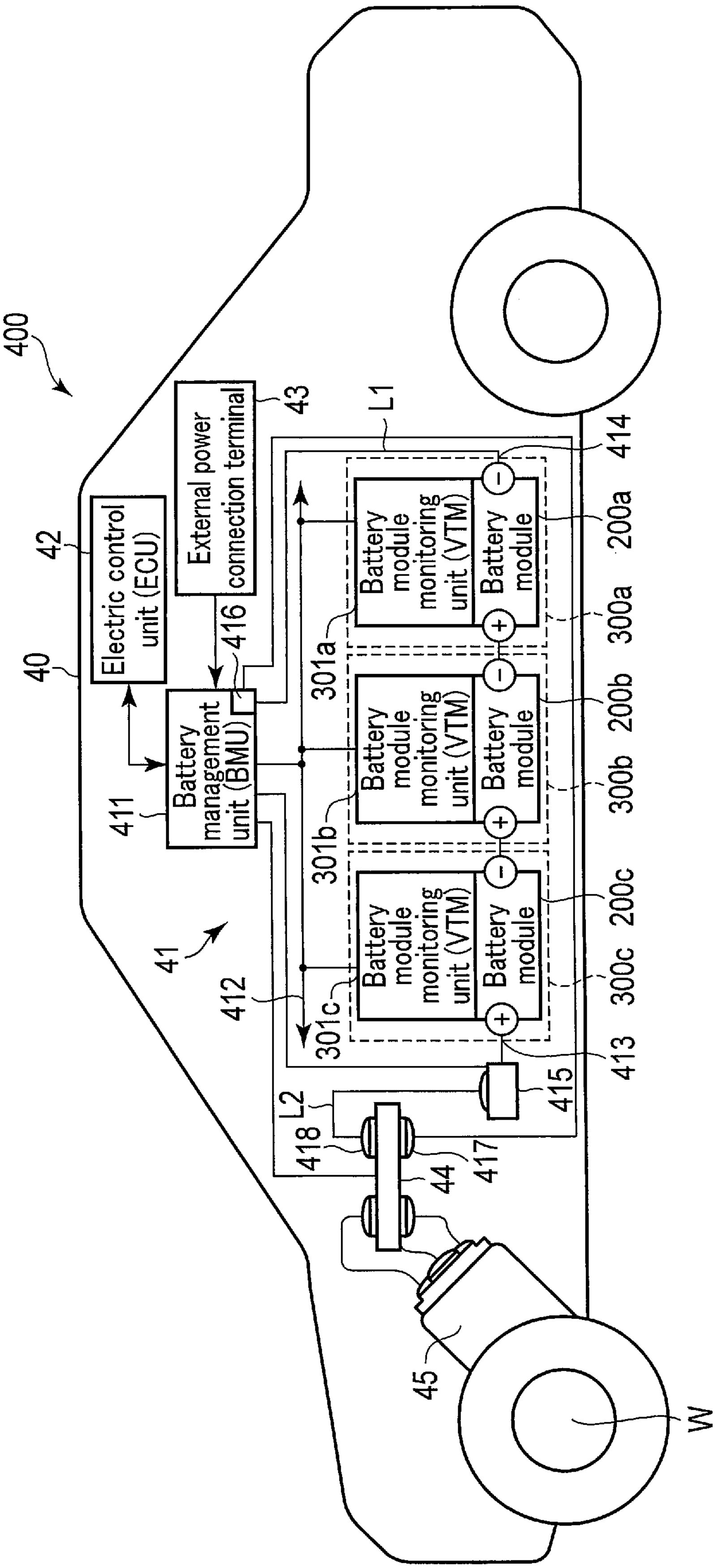
FIG. 11 is a diagram schematically showing an exemplary control system relating to the electric system of the vehicle according to the present embodiment.

FIG. 11 is a diagram schematically showing an exemplary control system relating to the electric system of the vehicle according to the present embodiment. The vehicle 400 of FIG. 11 is an electric automobile.

The vehicle 400 of FIG. 11 includes a vehicle body 40, a vehicle power source 41, a vehicle electric control unit (ECU) 42, which is a master controller of the vehicle power source 41, an external terminal (external power connection terminal) 43, an inverter 44, and a drive motor 45.

The vehicle 400 has the vehicle power source 41, for example, in the engine compartment, in the rear part of the car body, or underneath the seats. In the vehicle 400 of FIG. 11, the installation position of the vehicle power source 41 is only schematically indicated.

The vehicle power source 41 includes multiple battery packs (e.g., three battery packs) 300*a*, 300*b*, and 300*c*, a battery management unit (BMU) 411, and a communication bus 412.

The battery pack 300*a* includes a battery module 200*a* and a battery module monitoring unit 301*a* (e.g., voltage temperature monitoring (VTM) system). The battery pack 300*b* includes a battery module 200*b* and a battery module monitoring unit 301*b*. The battery pack 300*c* includes a battery module 200*c* and a battery module monitoring unit 301*c*. The battery packs 300*a* to 300*c* are similar to the aforementioned battery pack 300, and the battery modules 200*a* to 200*c* are similar to the aforementioned battery module 200. The battery modules 200*a* to 200*c* are electrically connected in series. The battery packs 300*a*, 300*b*, and 300*c* may be independently removed and exchanged with another battery pack 300.

Each of the battery modules 200*a* to 200*c* includes multiple unit-cell batteries coupled in series. At least one of the unit-cell batteries is a nonaqueous electrolyte battery according to the first embodiment. The battery modules 200*a* to 200*c* each pertain charging and discharging through the positive electrode terminal 413 and negative electrode terminal 414.

The battery management unit 411 communicates with the battery module monitoring units 301*a* to 301*c* to collect information regarding the voltage, temperature, and the like of each of the unit-cell batteries 100 of the battery modules 200*a* to 200*c* in the vehicle power source 41. In this manner, the battery management unit 411 can collect the safety information of the vehicle power source 41.

The battery management unit 411 and the battery module monitoring units 301*a* to 301*c* are connected by way of a communication bus 412. The communication bus 412 is designed such that a set of communication lines are shared by multiple nodes (between the battery management unit 411 and battery module monitoring units 301*a* to 301*c*). The communication bus 412 may be configured based on the Control Area Network (CAN) standards.

In response to a command communicated from the battery management unit 411, the battery module monitoring units 301*a* to 301*c* measure the voltages and temperatures of the unit-cell batteries in the respective battery modules 200*a* to 200*c*. The temperature measurement may be conducted only at several points for one battery module, and need not be conducted for all the unit-cell batteries.

The vehicle power source 41 may be provided with an electromagnetic contactor (such as a switch device 415 in FIG. 11) for switching the electrical connection between the positive electrode terminal 413 and negative electrode terminal 414. The switch device 415 includes a pre-charge switch (not shown) that is turned on to charge the battery modules 200*a* to 200*c*, and a main switch (not shown) that is turned on to supply an output from battery modules 200*a* to 200*c* to a load. The pre-charge switch and main switch each include a relay circuit (not shown) that is turned on and off in response to a signal supplied to a coil arranged near the switch elements. The electromagnetic contactor such as the switch device 415 is controlled based on a control signal from the battery management unit 411 or the vehicle ECU 42, which controls the entire operation of the vehicle 400.

The inverter 44 converts an input DC voltage to a three-phase AC high voltage for driving a motor. The three-phase output terminal of the inverter 44 is connected to the input terminals of the drive motor 45 for three phases. The inverter 44 is controlled based on a control signal from the battery management unit 411 or the vehicle ECU 42 that controls the entire operation of the vehicle. Through the control of the inverter 44, the output voltage of the inverter 44 is adjusted.

The drive motor 45 is rotated by the electric power supplied from the inverter 44. The driving force generated through the rotation of the drive motor 45 is transferred, for example via a differential gear unit, to the axle and driving wheels W.

The vehicle 400 is provided with a regenerative braking mechanism (regenerator), which is not shown. At the time of applying the brake to the vehicle 400, the regenerative braking mechanism rotates the drive motor 45 so as to convert the kinetic energy to electric energy as regenerative energy. The regenerative energy recovered by the regenerative braking mechanism is input to the inverter 44 and is converted to a DC current. The converted DC current is input to the vehicle power source 41.

The negative electrode terminal 414 of the vehicle power source 41 is connected to one terminal of a connecting line L1. The other terminal of the connecting line L1 is connected to the negative electrode input terminal 417 of the inverter 44. On this connecting line L1, the current detector (current detection circuit) 416 of the battery management unit 411 is provided between the negative electrode terminal 414 and negative electrode input terminal 417.

The positive electrode terminal 413 of the vehicle power source 41 is connected to one terminal of the connecting line L2. The other terminal of the connecting line L2 is connected to the positive electrode input terminal 418 of the inverter 44. In the connecting line L2, a switch device 415 is provided between the positive electrode terminal 413 and positive electrode input terminal 418.

The external terminal 43 is connected to the battery management unit 411. The external terminal 43 may be connected to an external power source.

The vehicle ECU 42 performs cooperative control of the vehicle power source 41, switch device 415, and inverter 44, and the like, together with other management devices and control devices including the battery management unit 411 in response to an input manipulated by a driver or the like. Through the cooperative control of the vehicle ECU 42 and the like, a power output from the vehicle power source 41 and charging of the vehicle power source 41 are controlled so that the entire management of the vehicle 400 can be performed. Data concerning the maintenance of the vehicle power source 41 such as the remaining power amount of the vehicle power source 41 is transferred between the battery management unit 411 and vehicle ECU 42 through communication lines.

The vehicle according to the fourth embodiment includes the battery pack according to the third embodiment. The present embodiment therefore offers a vehicle with a battery pack that can suppress self-discharge.

EXAMPLES

Examples will be described below; however, the embodiments are not limited to these examples.

Example 1

<Preparation of Positive Electrode>

A positive electrode was prepared as indicated below.

A slurry was prepared by adding and mixing in a solvent of N-methylpyrrolidone (NMP) 90 wt % $LiMn_2O_4$ powder as a positive electrode active material, 5 wt % acetylene black (AB) as an electro-conductive agent, and 5 wt % polyvinylidene fluoride (PVdF) as a binder. This slurry was applied in a coating amount of 100 g/m$^2$ to the 20 μm-thick aluminum foil to form a positive electrode current collector, and was dried on a 120° C. hot plate to remove the solvent. The coating was conducted on the back surface in a similar manner. Thereafter, the structure was pressed by a roll press machine to an electrode density of 2.5 g/cc. A double-side coated positive electrode was thereby obtained.

<Preparation of Negative Electrode>

A negative electrode was prepared as indicated below.

A slurry was prepared by adding and mixing in a solvent of N-methylpyrrolidone (NMP) 87 wt % $Ti_2NbO_7$ (monoclinic niobium-titanium oxide) particles as a negative electrode active material, 4 wt % acetylene black (AB) and 4 wt % multi-walled carbon nanotubes (MWCNT) as an electro-conductive agent, and 5 wt % polyvinylidene fluoride (PVdF) as a binder. The multi-walled carbon nanotubes demonstrated an average fiber diameter of 10 nm, an average fiber length of 25 μm, and contained 10000 ppm Co as impurities. For the mixture, 1 mm-diameter glass beads were mixed in an amount equivalent to 50% by weight of the negative electrode active material at a solid content concentration of 60% for 10 minutes at 2000 rpm with a planetary centrifugal mixer. The mixed slurry was filtered with a mesh to remove the glass beads. This slurry was applied in a coating amount of 100 g/m$^2$ to the 20 μm-thick aluminum foil to form a current collector, and was dried on a 120° C. hot plate to remove the solvent. The coating was conducted on the back surface in a similar manner. Thereafter, the structure was pressed by a roll press machine to an electrode density of 2.0 g/cc. A double-side coated negative electrode was thereby obtained.

<Preparation of Electrode Group>

The positive electrode and negative electrode were cut out to have an electrode area of 65 mm×30 mm. As a separator, a 25 μm-thick porous film of polyethylene was prepared. Positive electrodes, negative electrodes, and separators were alternately and repeatedly stacked in the order of a positive electrode, a separator, a negative electrode, and a separator in such a manner that the topmost layer and the lowermost layer of the stacked structure become separators. The outer edges of the structure were taped. By heat-pressing this structure at 80° C., a stacked electrode group was obtained.

<Preparation of Nonaqueous Electrolyte Battery>

The positive electrode terminal and negative electrode terminal were welded to the electrode group. The positive electrode terminal was welded to a slurry-uncoated portion of the positive electrode current collector. The negative electrode terminal was welded to a slurry-uncoated portion of the negative electrode current collector.

Next, the electrode group was placed in a bag made of a laminate film and subjected to vacuum drying at 80° C. for 24 hours. A laminate film prepared by forming a polypropylene layer on each surface of a 40 lam-thick aluminum foil and having the entire thickness of 0.1 mm was used. An electrolyte was prepared by dissolving $LiPF_6$ as an electrolyte salt at a molarity of 1.2M into a solution of polypropylene carbonate (PC) and diethyl carbonate (DEC) mixed at a volume ratio of 1:1. This electrolyte was injected into the laminate film bag holding the electrode group. Thereafter, the bag was thermally sealed up to obtain a nonaqueous electrolyte battery having a width of 35 mm, a thickness of 3.2 mm, a height of 65 mm, and a capacity of 2 Ah. The produced nonaqueous electrolyte battery was a secondary battery.

<Initial Adjustment>

The prepared nonaqueous electrolyte battery was subjected to initial adjustment in a manner indicated below.

First, pre-charge retention was performed. In the pre-charge retention, a nonaqueous electrolyte battery in an uncharged state was retained at 80° C. for 24 hours. Thereafter, initial charging was conducted, at 0° C. at the rate of 5 C with a constant current (CC).

Then, discharging was conducted at 25° C. at the rate of 1 C until the battery voltage reached 1.5 V. Thereafter, charging was conducted at the rate of 1 C until the battery voltage reached 2.8 V. Given that a set of this charging and discharging is one cycle, charging/discharging was repeated for 100 cycles.

Example 2

Multi-walled carbon nanotubes (MWCNT) were prepared so as to contain Fe in 5000 ppm as impurities. Other than this, a nonaqueous electrolyte battery was produced in the same manner as Example 1. The initial adjustment was conducted in the same manner as for Example 1.

Example 3

MWCNT were prepared by changing the impurity content to 50 ppm or less. Cu powder was added at 10000 ppm with respect to the mass of MWCNT. Other than these, a nonaqueous electrolyte battery was produced in the same manner as Example 1. The initial adjustment was conducted in the same manner as for Example 1.

Example 4

Ni powder was added in place of Cu powder. Other than this, a nonaqueous electrolyte battery was produced in the same manner as Example 3. The initial adjustment was conducted in the same manner as for Example 1.

Example 5

A nonaqueous electrolyte battery was produced in the same manner as Example 1. The initial charging was conducted at 25° C. Other than this, the initial adjustment was conducted in the same manner as for Example 1.

Example 6

A nonaqueous electrolyte battery was produced in the same manner as Example 1. A pre-charge retention was conducted for 48 hours. Other than this, the initial adjustment was conducted in the same manner as for Example 1.

Example 7

A nonaqueous electrolyte battery was produced in the same manner as Example 1. A pre-charge retention was conducted for 6 hours. Other than this, the initial adjustment was conducted in the same manner as for Example 1.

Example 8

A nonaqueous electrolyte battery was produced in the same manner as Example 1. The initial charging was conducted at the charging rate of 10 C. Other than this, the initial adjustment was conducted in the same manner as for Example 6.

Example 9

$Li_4Ti_5O_{12}$ (TLO) was adopted as a negative electrode active material. Other than this, a nonaqueous electrolyte battery was produced in the same manner as Example 1. The initial adjustment was conducted in the same manner as for Example 1.

Example 10

A wound electrode group was prepared in place of the stacked electrode group. Other than this, a nonaqueous electrolyte battery was produced in the same manner as Example 1. The initial adjustment was conducted in the same manner as for Example 1.

The wound electrode group was prepared in the manner as follows. A positive electrode, a separator formed of a 25 μm-thick polyethylene porous film, a negative electrode, and another separator are stacked in this order, and rolled into a scroll pattern. The structure was thermally pressed at 90° C. to produce an oblate, wound electrode group having a width of 30 mm and a thickness of 3.0 mm.

Comparative Example 1

A nonaqueous electrolyte battery was produced in the same manner as Example 1. The initial adjustment was conducted by constant-current charging until the battery voltage reached 2.0 V and then retaining the battery for 200 hours.

<Evaluation>

The nonaqueous electrolyte batteries subjected to the initial adjustment were further adjusted so as to demonstrate a battery voltage of 2.25 V. The change in the battery voltages of these nonaqueous electrolyte batteries was monitored for 180 days.

The nonaqueous electrolyte battery after the storage test was fully discharged at 0.2 C, and then was disassembled in a glove box filled with argon to remove the separator. From the removed separator, the outermost layer and inner layer were cut out in the following manner.

With regard to Examples 1 to 9 and Comparative Example 1 having an electrode group of a stacked-type structure, the outermost layer and inner layer of the separator were cut out in the following manner.

From the separator in contact with the positive electrode positioned outermost in the electrode group, the region interposed between the positive electrode and negative electrode was cut out. Furthermore, from the separator in contact with the negative electrode positioned outermost in the electrode group, the region interposed between the negative electrode and positive electrode was cut out. These two regions were obtained as the outermost layers.

A region positioned interposed between the positive electrode and negative electrode was cut out of the separator positioned inside in the laminating direction of the electrode group with respect to the aforementioned two outermost layers, and obtained as an inner layer.

With regard to Example 10 having an electrode group of a wound-type structure, the outermost layer and inner layer of the separator were cut out in the following manner.

First, a region of the separator interposed between the negative electrode and positive electrode was cut out of the separator. Of this region, one end positioned in an outer end portion of the electrode group was considered to be one end of the outermost layer. The portion of one layer inside the outermost layer, which corresponds to one end of the outermost layer, was considered to be the other end of the outermost layer. The separator was cut along the above "one end" and "other end" to obtain a portion in-between as the outermost layer.

Of the above region, the portion of the electrode group inside with respect to the outermost layer was obtained as an inner layer. One end of the inner layer was the other end of the outermost layer.

The above obtained outermost layer and inner layer of the separator were subjected to ultrasonic cleaning for five minutes while being impregnated with ethanol. The cleaned separator was air-dried. In this manner, observation samples were obtained.

The observation samples were subjected to the aforementioned XRF analysis to find the composition of the metal-element containing portion, the area of metal-element containing portion, the number of metal-element containing portions per unit area in the outermost layer, and the number of metal-element containing portions per unit area in the inner layer.

For the measurement of the composition and the area of the metal-element containing portion, a 5-centimeter square at the center of a sample was defined as a measurement range, and the XRF analysis was conducted upon this range. As a sample, the outermost layer and an inner layer of the separator were used. Binarization and image analysis were conducted upon the XRF mapping image for each of the outermost layer and inner layer to count the number of metal-element containing portions per unit area.

In connection with the examples and comparative examples of the nonaqueous electrolyte batteries, Table 1 shows types of metal elements contained in the metal-element containing portion, the area ($mm^2$) of a metal-element containing portion, the number of metal-element containing portions per unit area (portions per square meter) in the outermost layer, the number of metal-element containing portions per unit area (portions per square meter) in an inner layer, the negative electrode active material, the structure of the electrode group, and the change of the battery voltage. As the change of the battery voltage, the difference (V) in the battery voltage between the first day and 180th day is indicated in Table 1.

having an area of 0.3 $mm^2$ or larger and 3.2 $mm^2$ or smaller. The nonaqueous electrolyte battery of Comparative Example 1 had a metal-element containing portion having an area larger than 3.2 $mm^2$. In comparison with Comparative Example 1, all of the nonaqueous electrolyte batteries according to the Examples exhibited a smaller change of the battery voltage.

Regarding the types of metal elements contained in the metal-element containing portion, Example 1 contained Co, Example 2 contained Fe, Example 3 contained Cu, and Example 4 contained Ni. In comparison with Comparative Example 1, all of Examples 1 to 4 exhibited a smaller change of the battery voltage. This shows that, regardless of the types of contained metal elements, the nonaqueous electrolyte battery according to the embodiment demonstrated the capability of suppressing self-discharging.

The metal element in the metal-element containing portions of Examples 1 and 2 was attributed to the impurities in the material, MWCNT. The metal element in the metal-element containing portions of Examples 3 and 4 was attributed to the metallic powder. This reveals that the nonaqueous electrolyte battery according to the present embodiment demonstrated the capability of suppressing self-discharge, regardless of the impurities attributed to its material or a foreign substance.

In a comparison of Examples 1 and 5, Example 1, for which the initial charging was conducted under a low-temperature condition, had a smaller metal-element containing portion than that of Example 5, and a larger number of metal-element containing portions per unit area in the outermost layer. In addition, the change of the battery voltage was smaller.

TABLE 1

| | Type of metal element | Area of metal-element containing portion ($mm^2$) | Number of metal-element containing portions per unit area in outermost layer (portions/$m^2$) | Number of metal-element containing portions per unit area in inner layer (portions/$m^2$) | Negative electrode active material | Structure of electrode group | Change of battery voltage (V) |
|---|---|---|---|---|---|---|---|
| Example 1 | Co | 0.34 | 246 | 31 | $Ti_2NbO_7$ | Stacked | 0.02 |
| Example 2 | Fe | 0.36 | 200 | 26 | $Ti_2NbO_7$ | Stacked | 0.02 |
| Example 3 | Cu | 0.38 | 243 | 34 | $Ti_2NbO_7$ | Stacked | 0.03 |
| Example 4 | Ni | 0.32 | 250 | 36 | $Ti_2NbO_7$ | Stacked | 0.02 |
| Example 5 | Co | 0.79 | 201 | 25 | $Ti_2NbO_7$ | Stacked | 0.04 |
| Example 6 | Co | 0.33 | 890 | 70 | $Ti_2NbO_7$ | Stacked | 0.03 |
| Example 7 | Co | 0.32 | 104 | 10 | $Ti_2NbO_7$ | Stacked | 0.03 |
| Example 8 | Co | 0.36 | 1290 | 156 | $Ti_2NbO_7$ | Stacked | 0.02 |
| Example 9 | Co | 0.39 | 240 | 27 | $Li_4Ti_5O_{12}$ | Stacked | 0.01 |
| Example 10 | Co | 0.47 | 202 | 22 | $Ti_2NbO_7$ | Wound | 0.04 |
| Comparative Example 1 | Co | 11.5 | 36 | 14 | $Ti_2NbO_7$ | Stacked | 0.17 |

As a result of the analysis of the composition of the metal-element containing portions, it was found that all of the metal-element containing portions contained in the nonaqueous electrolyte batteries of the examples and comparative example were a metal formed of a single metal element.

As a result of the counting of the number of metal-element containing portions per unit area, it was found that all of the nonaqueous electrolyte batteries of the Examples included a larger number of metal-element containing portions per unit area in the outermost layer than the number of metal-element containing portions per unit area in the inner layer.

The nonaqueous electrolyte battery according to each of the examples had metal-element containing portions each In a comparison of Example 1 with Examples 6 and 7, Example 6 with a longer pre-charge retention tended to include a larger number of metal-element containing portions per unit area in the outermost layer than Examples 1 and 7. Example 7 with a shorter pre-charge retention tended to include a smaller number of metal-element containing portions per unit area in the outermost layer than Examples 1 and 6. Moreover, in a comparison of Example 6 with Example 8, Example 8 that was initially charged at a higher charging rate tended to include a larger number of metal-element containing portions per unit area in the outermost layer than Example 6.

Example 9 adopting TLO as a negative electrode active material demonstrated a smaller change of the battery voltage than Comparative Example 1. This reveals that a nonaqueous electrolyte battery having TLO as a negative electrode active material also demonstrated the capability of suppressing self-discharge.

Example 10 having an electrode group of a wound structure also demonstrated a smaller change of the battery voltage than Comparative Example 1. This reveals that a nonaqueous electrolyte battery having an electrode group of a wound structure demonstrated the capability of suppressing self-discharge.

According to at least one of the embodiments described above, a nonaqueous electrolyte battery having an electrode group that includes a positive electrode, a negative electrode, and a separator is offered. The separator includes at least one metal-element containing portion containing a metal element. The at least one metal-element containing portion is provided on the surface of the separator in contact with the negative electrode, where the at least one metal-element containing portion contains at least one selected from a group consisting of a metal, a metallic oxide, and a metallic fluoride. The area of at least one metal-element containing portion is in the range of 0.3 $mm^2$ or larger and 3.2 $mm^2$ or smaller. Such a nonaqueous electrolyte battery can suppress self-discharge.

Additional notes according to the embodiments are indicated below.

<1> A nonaqueous electrolyte battery including an electrode group, which includes a positive electrode, a negative electrode, and a separator, wherein the separator includes at least one metal-element containing portion containing a metal element, the at least one metal-element containing portion being provided on a surface of the separator in contact with the negative electrode, the at least one metal-element containing portion containing at least one selected from a group consisting of a metal, a metallic oxide, and a metallic fluoride, and an area of the at least one metal-element containing portion is 0.3 $mm^2$ or larger and 3.2 $mm^2$ or smaller.

<2> The nonaqueous electrolyte battery according to <1>, wherein the separator includes a region between the positive electrode and the negative electrode, within the region, an outermost layer positioned outermost in the electrode group includes a plurality of the metal-element containing portion, and a number of metal-element containing portions per unit area in the outermost layer is 200 metal-element containing portions per square meter or more and 1290 metal-element containing portions per square meter or less.

<3> The nonaqueous electrolyte battery according to <1> or <2>, wherein the separator includes a region between the positive electrode and the negative electrode, and within the region, a number of metal-element containing portions per unit area in an outermost layer positioned outermost in the electrode group is larger than a number of metal-element containing portions per unit area in an inner layer positioned inside with respect to the outermost layer.

<4> The nonaqueous electrolyte battery according to any one of <1> to <3>, wherein the negative electrode includes a negative electrode active material, and the negative electrode active material includes at least one selected from the group consisting of titanium oxide and niobium-titanium oxide.

<5> The nonaqueous electrolyte battery according to any one of <1> to <4>, wherein the metal-element containing portion includes at least one selected from the group consisting of the metal containing the metal element, the metallic oxide containing the metal element, and the metallic fluoride containing the metal element, and the metal element is at least one selected from the group consisting of Co, Fe, Cu, Ni, and Mn.

<6> A battery pack including the nonaqueous electrolyte battery according to any one of <1> to <5>.

<7> The battery pack according to <6>, further including:

an external power distribution terminal; and a protective circuit.

<8> The battery pack according to <6> or <7>, which includes a plurality of the nonaqueous electrolyte battery, the nonaqueous electrolyte batteries are electrically connected to each other in series, in parallel, or in a combination of in-series connection and parallel connection.

<9> A vehicle including the battery pack according to any one of <6> to <8>.

<10> The vehicle according to <9>, comprising a mechanism configured to convert kinetic energy of the vehicle into regenerative energy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising an electrode group that includes a positive electrode, a negative electrode, and a separator, wherein the separator includes a plurality of discrete portions, the discrete portions being provided on a surface of the separator in contact with the negative electrode, the discrete portions containing at least one selected from a group consisting of a metal containing a metal element, a metallic oxide containing the metal element, and a metallic fluoride containing the metal element, and an area of each of the discrete portions is 0.3 $mm^2$ or larger and 3.2 $mm^2$ or smaller, the separator includes a region between the positive electrode and the negative electrode, within the region, an outermost layer is positioned outermost in the electrode group, and a number of the discrete portions per unit area in the outermost layer is 200 per square meter or more and 1290 per square meter or less.

2. The nonaqueous electrolyte battery according to claim 1, wherein within the region, the number of the discrete portions per unit area in the outermost layer is larger than a number of the discrete portions per unit area in an inner layer positioned inside with respect to the outermost layer.

3. The nonaqueous electrolyte battery according to claim 1, wherein the negative electrode includes a negative electrode active material, and the negative electrode active material includes at least one selected from a group consisting of titanium oxide and niobium-titanium oxide.

4. The nonaqueous electrolyte battery according to claim 1, wherein the metal element is at least one selected from a group consisting of Co, Fe, Cu, Ni, and Mn.

5. A battery pack including the nonaqueous electrolyte battery according to claim 1.

6. The battery pack according to claim 5, further comprising:

an external power distribution terminal, and a protective circuit.

7. The battery pack according to claim 5, which includes a plurality of the nonaqueous electrolyte battery, and the nonaqueous electrolyte batteries are electrically connected to each other in series, in parallel, or in a combination of in-series connection and parallel connection.

8. A vehicle comprising the battery pack according to claim 5.

9. The vehicle according to claim 8, comprising a mechanism configured to convert kinetic energy of the vehicle into regenerative energy.

* * * * *